June 23, 1936.  J. W. BRYCE  2,045,436

ACCOUNTING MACHINE

Filed May 4, 1932  21 Sheets-Sheet 1

INVENTOR
James W. Bryce
BY
Cooper, Kerr & Dunham
ATTORNEYS

June 23, 1936.  J. W. BRYCE  2,045,436
ACCOUNTING MACHINE
Filed May 4, 1932   21 Sheets-Sheet 2
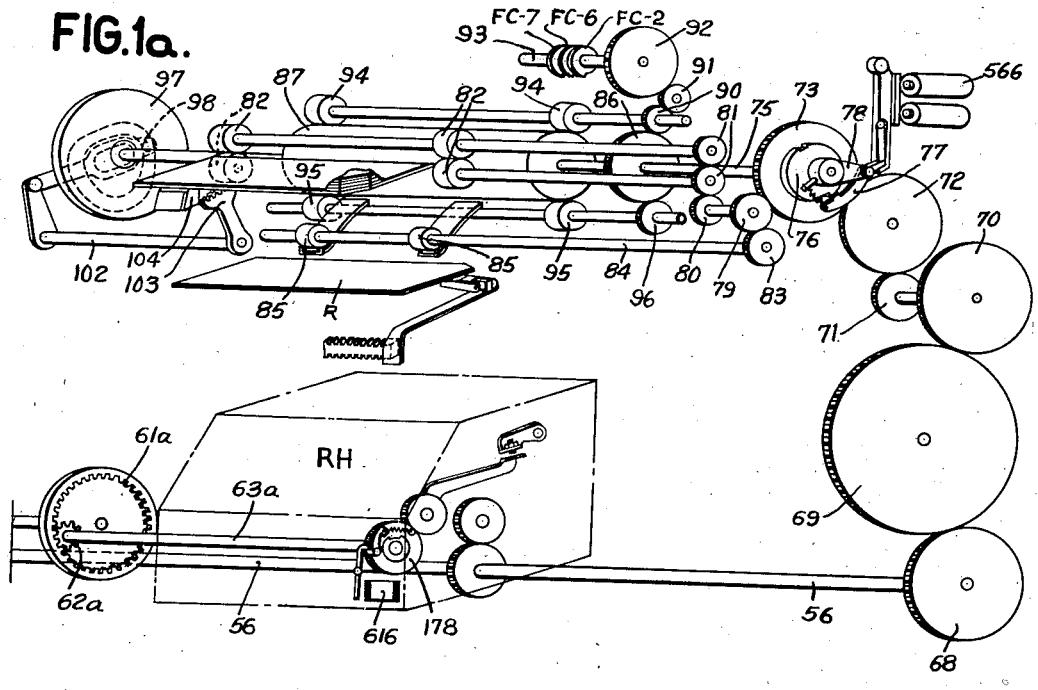
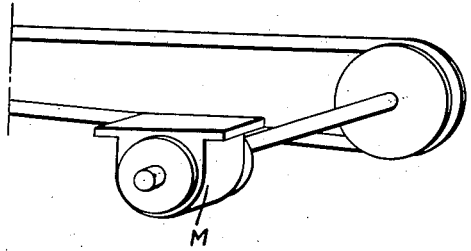
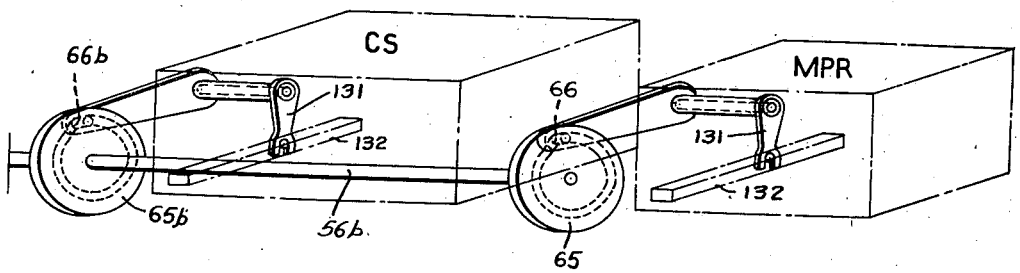
INVENTOR
James W. Bryce
BY
Cooper, Kerr & Dunham
ATTORNEYS June 23, 1936. J. W. BRYCE 2,045,436
ACCOUNTING MACHINE
Filed May 4, 1932 21 Sheets-Sheet 3

INVENTOR
James W. Bryce
BY
Cooper, Kerr & Dunham
ATTORNEYS

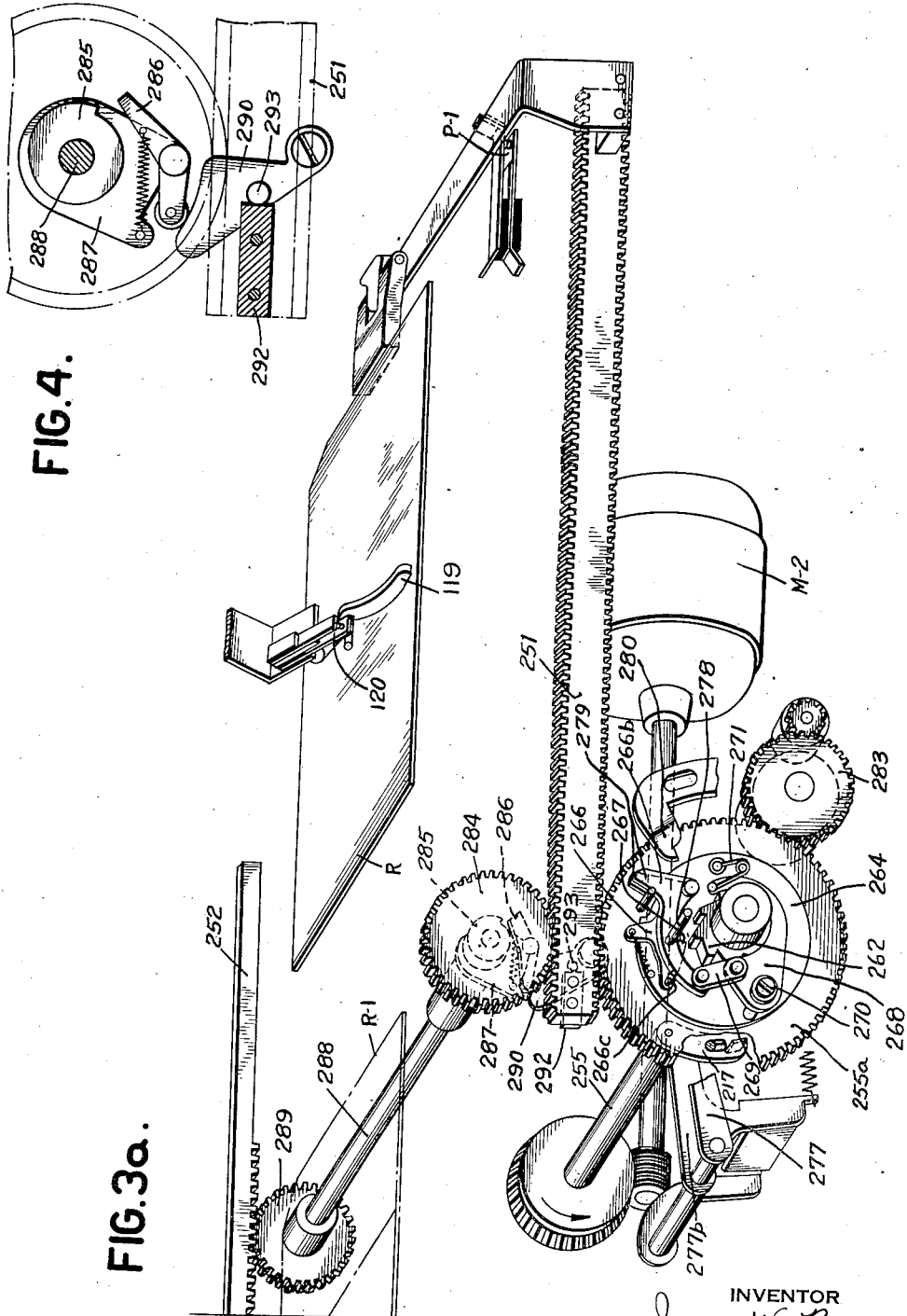

June 23, 1936.  J. W. BRYCE  2,045,436
ACCOUNTING MACHINE
Filed May 4, 1932   21 Sheets-Sheet 5
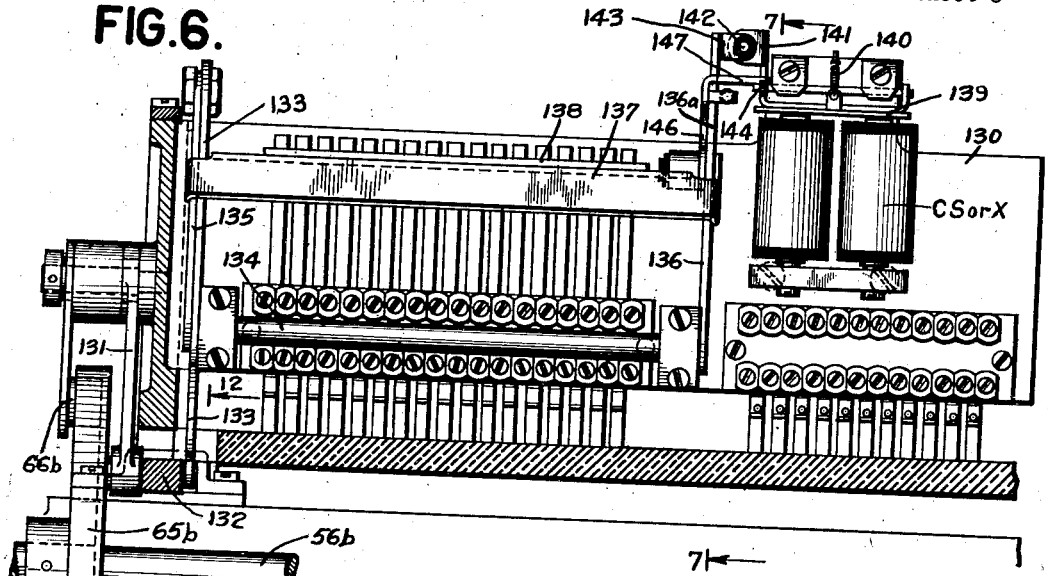
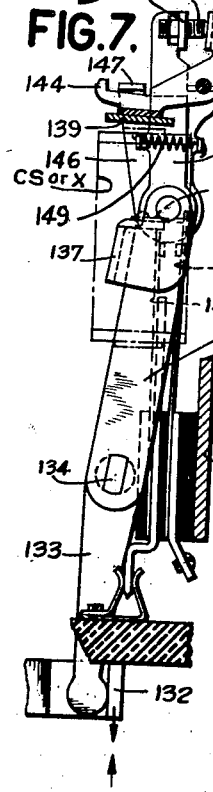
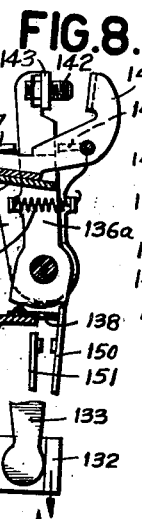
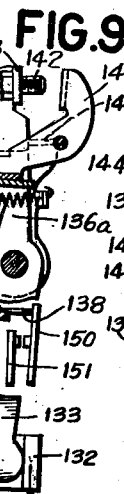
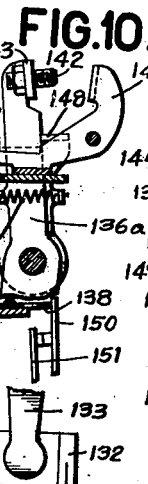
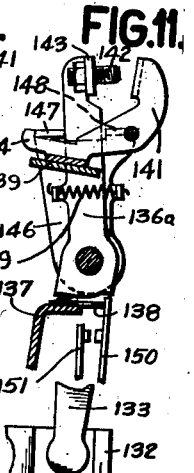
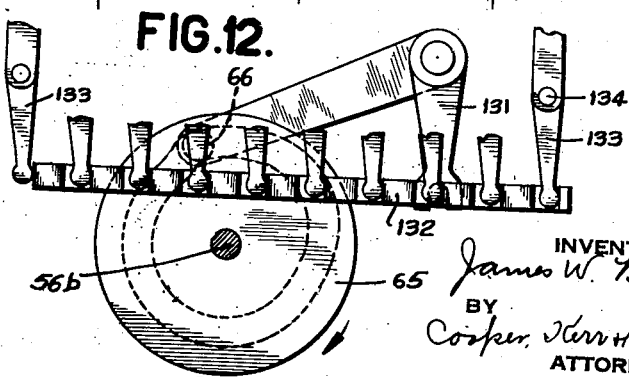
INVENTOR
James W. Bryce
BY
Cooper, Kerr & Dunham
ATTORNEYS

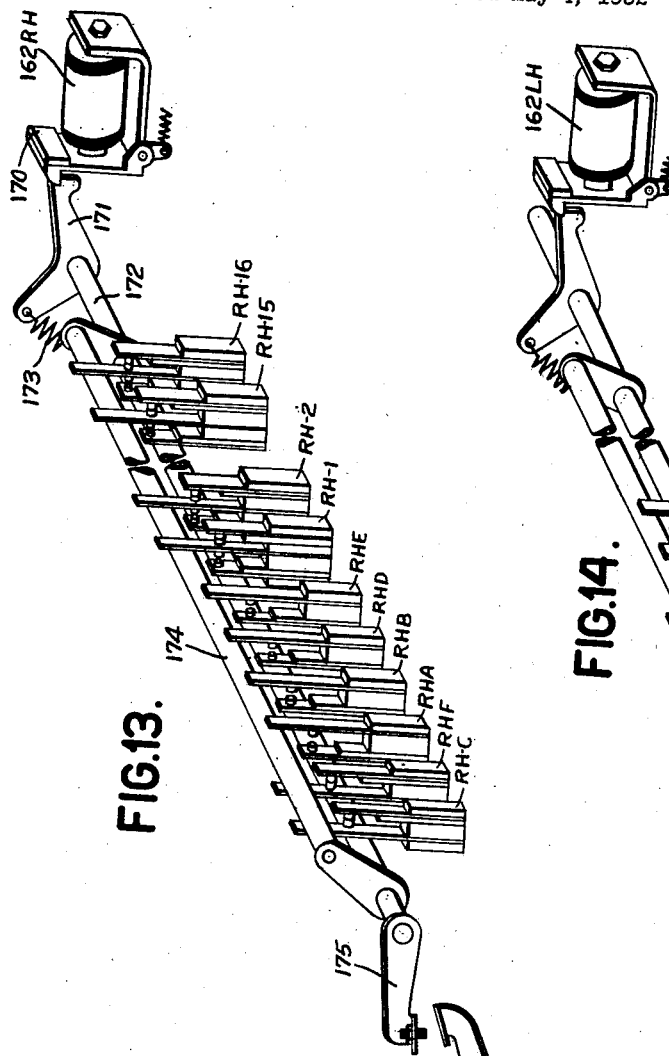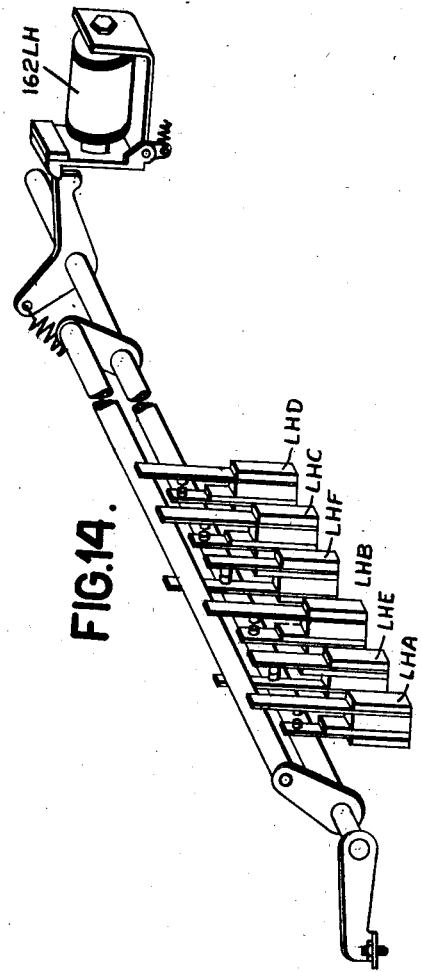

June 23, 1936.  J. W. BRYCE  2,045,436
ACCOUNTING MACHINE
Filed May 4, 1932   21 Sheets-Sheet 7
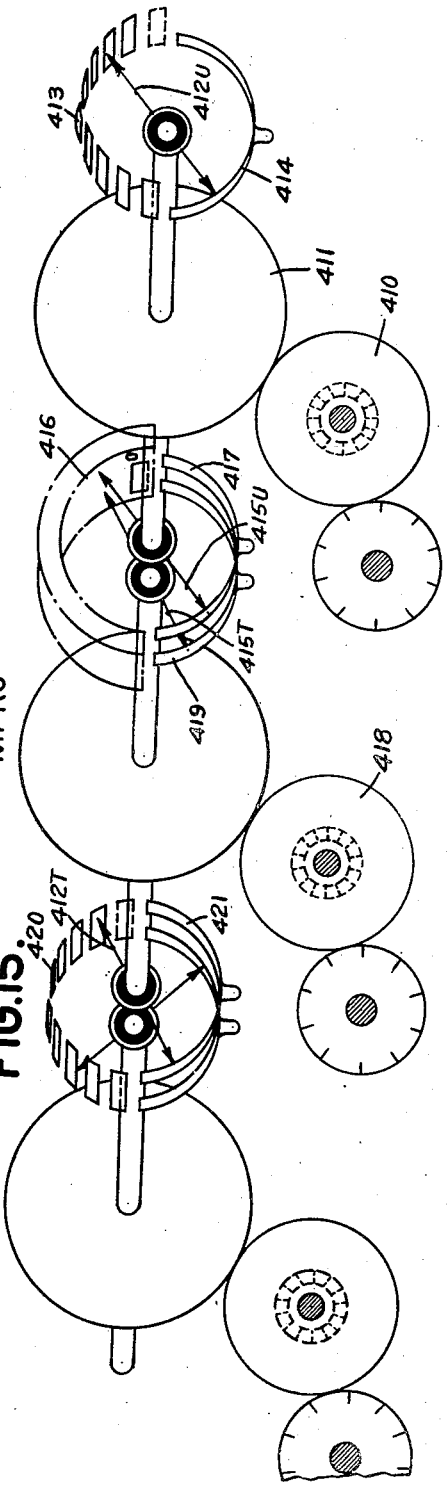
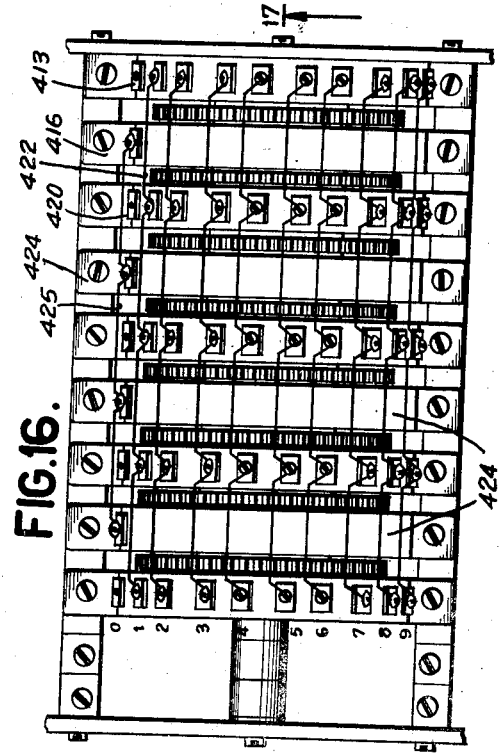
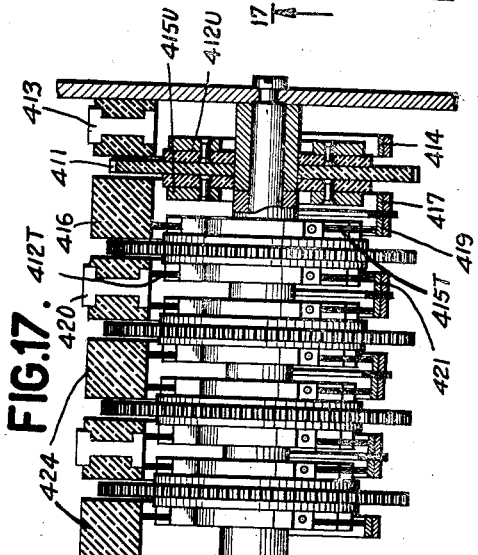
INVENTOR
James W. Bryce
BY
Cooper, Kerr & Dunham
ATTORNEYS June 23, 1936.  J. W. BRYCE  2,045,436
ACCOUNTING MACHINE
Filed May 4, 1932  21 Sheets-Sheet 8
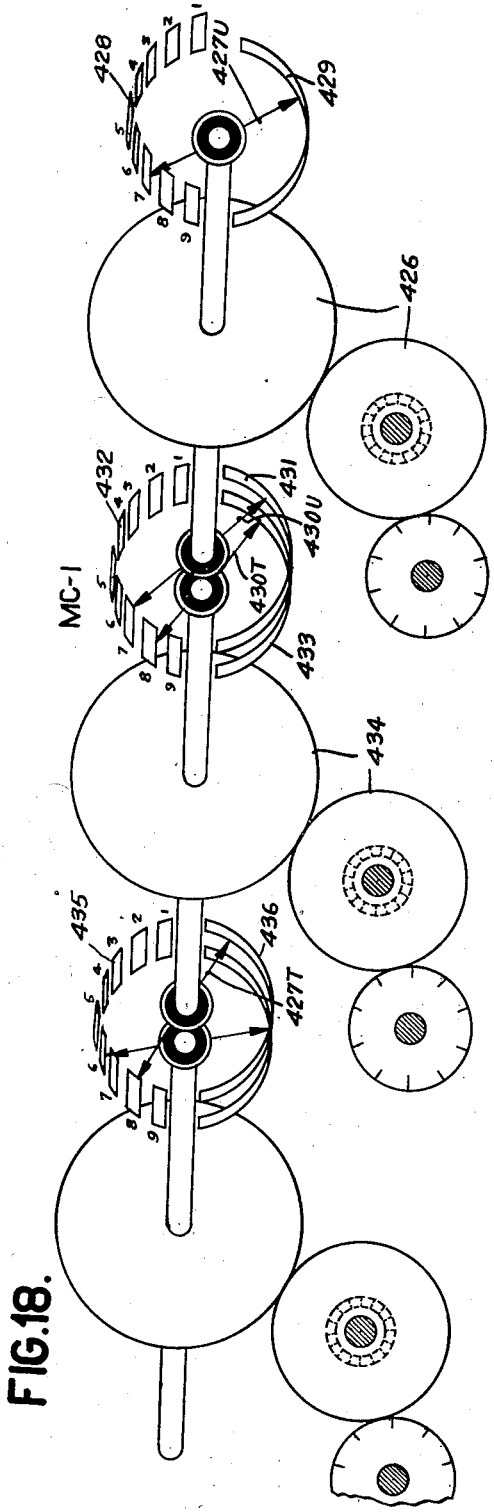
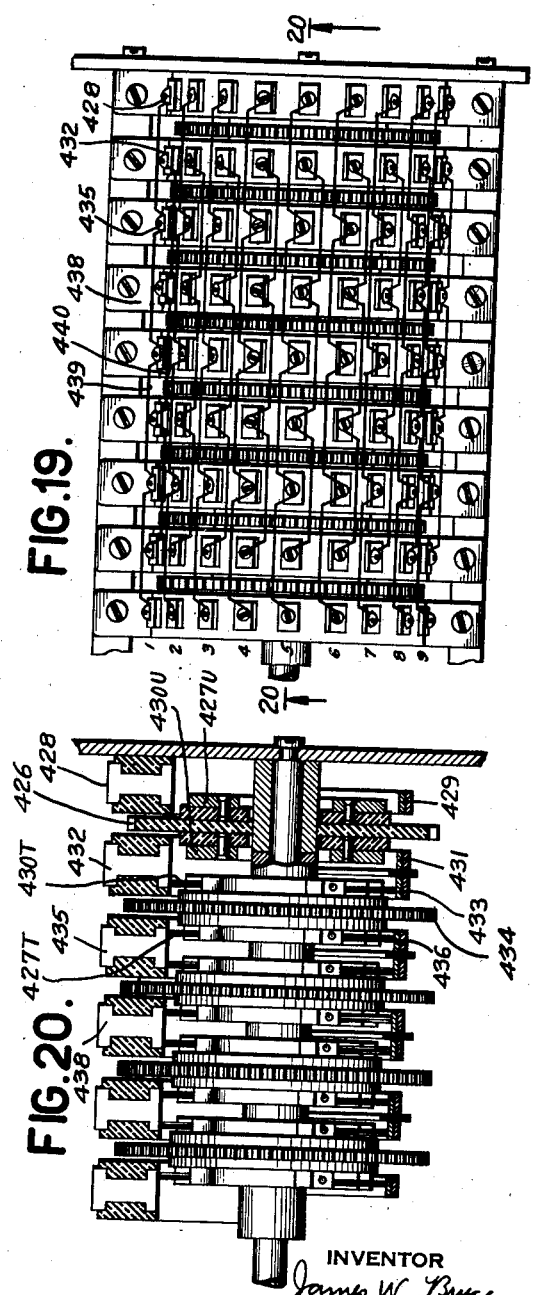
INVENTOR
James W. Bryce
BY
Cooper, Kerr & Dunham
ATTORNEYS June 23, 1936.    J. W. BRYCE    2,045,436
ACCOUNTING MACHINE
Filed May 4, 1932    21 Sheets-Sheet 9
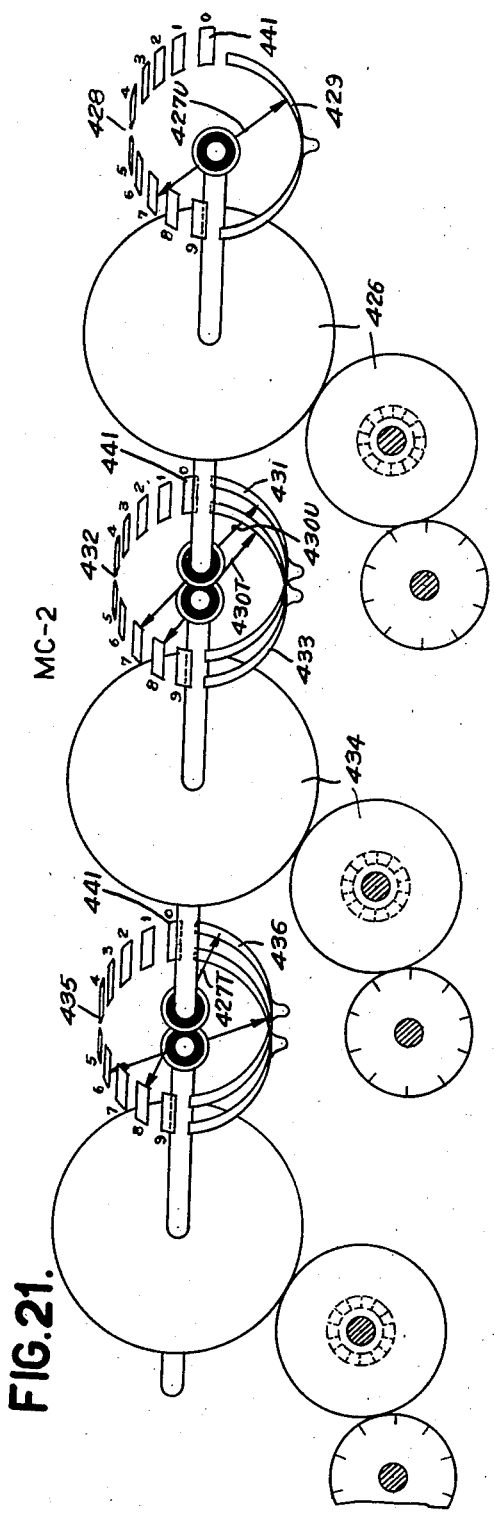
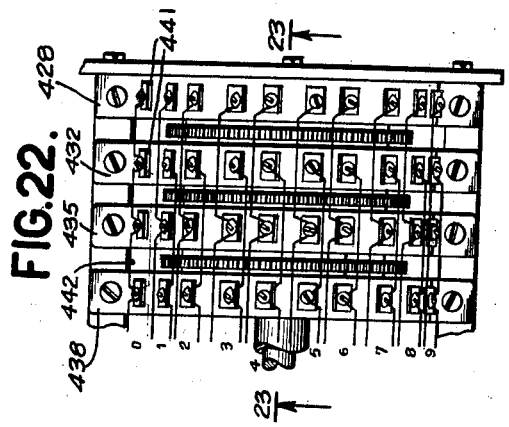
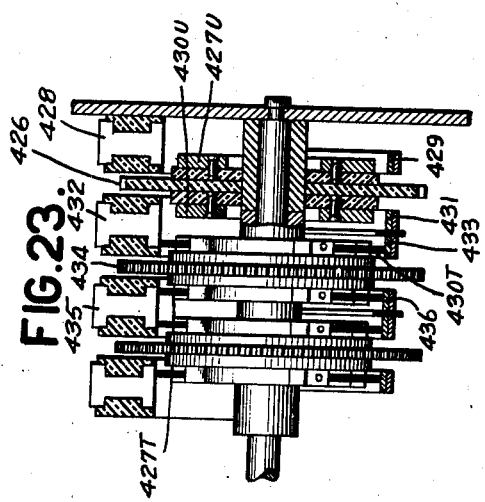
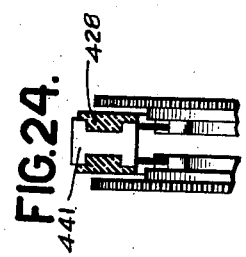
INVENTOR
James W. Bryce
BY
Cooper, Kerr & Dunham
ATTORNEYS June 23, 1936.　　　J. W. BRYCE　　　2,045,436
ACCOUNTING MACHINE
Filed May 4, 1932　　　21 Sheets-Sheet 10

INVENTOR
James W. Bryce
BY
Cooper, Kerr & Dunham
ATTORNEYS

June 23, 1936.    J. W. BRYCE    2,045,436
ACCOUNTING MACHINE
Filed May 4, 1932    21 Sheets-Sheet 11

INVENTOR
James W. Bryce
BY
Cooper, Kerr & Dunham
ATTORNEYS

June 23, 1936.  J. W. BRYCE  2,045,436
ACCOUNTING MACHINE
Filed May 4, 1932  21 Sheets-Sheet 12

INVENTOR
James W. Bryce
BY
Cooper, Kerr & Dunham
ATTORNEYS

June 23, 1936.   J. W. BRYCE   2,045,436
ACCOUNTING MACHINE
Filed May 4, 1932   21 Sheets-Sheet 13

INVENTOR
James W. Bryce
ATTORNEYS

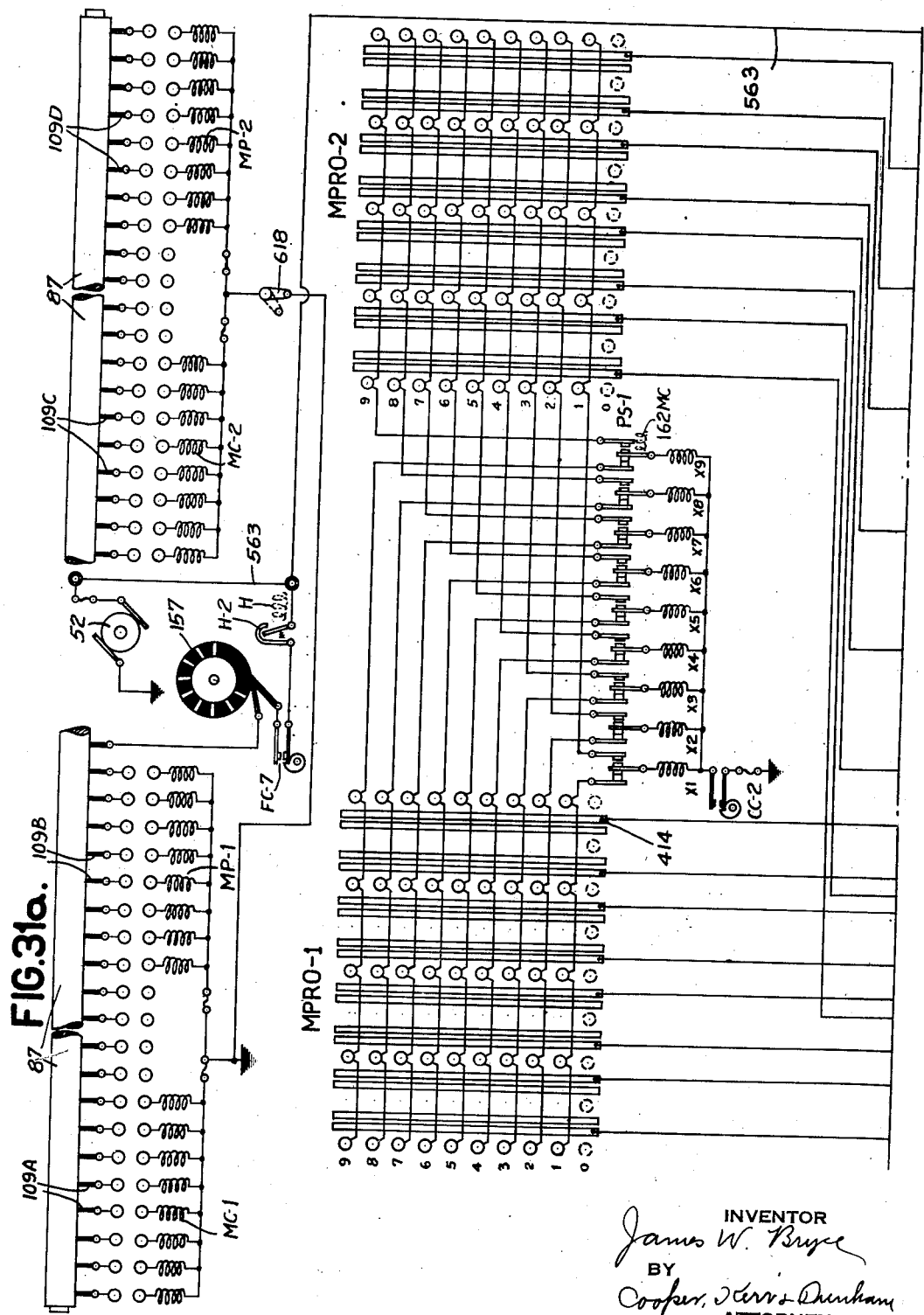

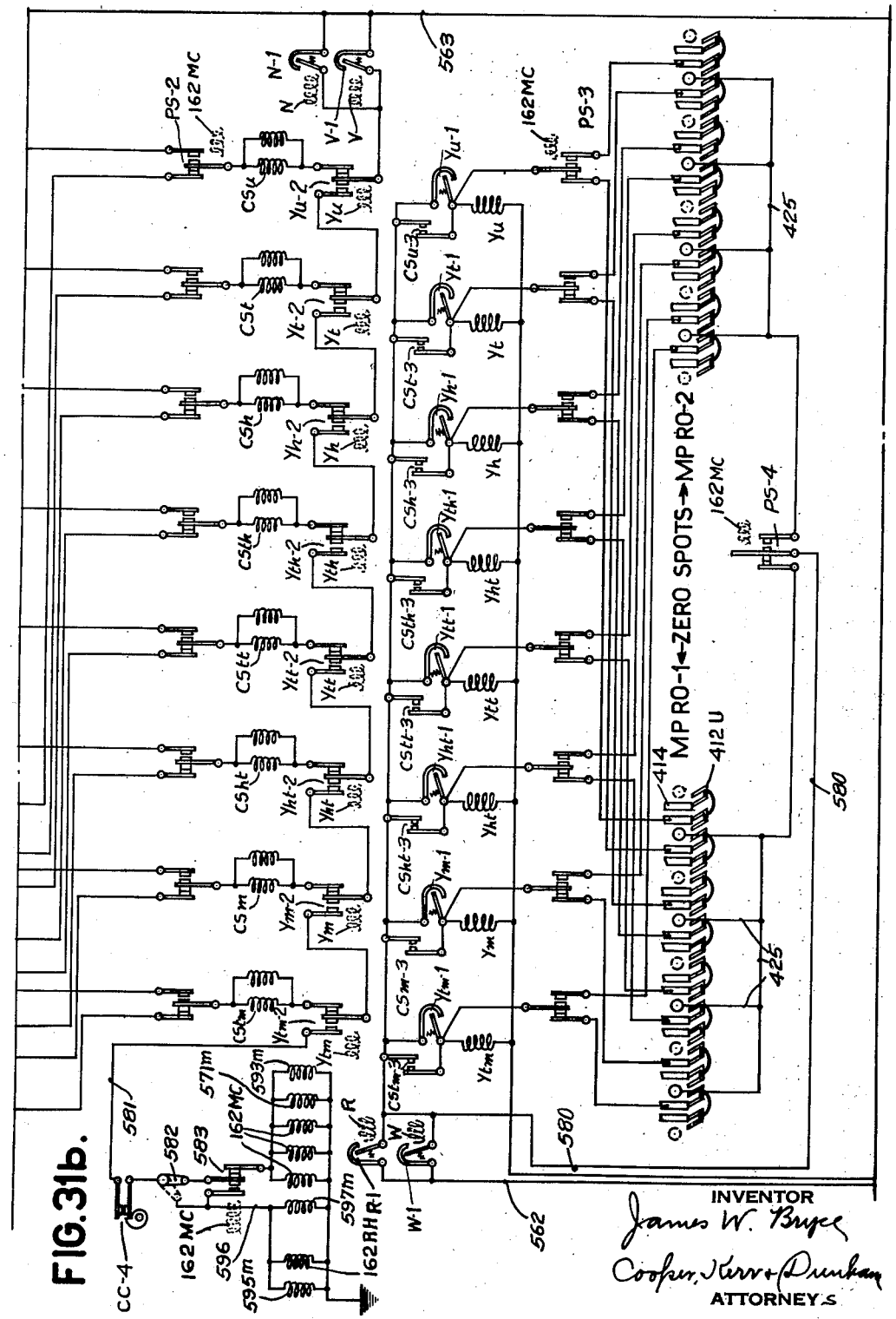

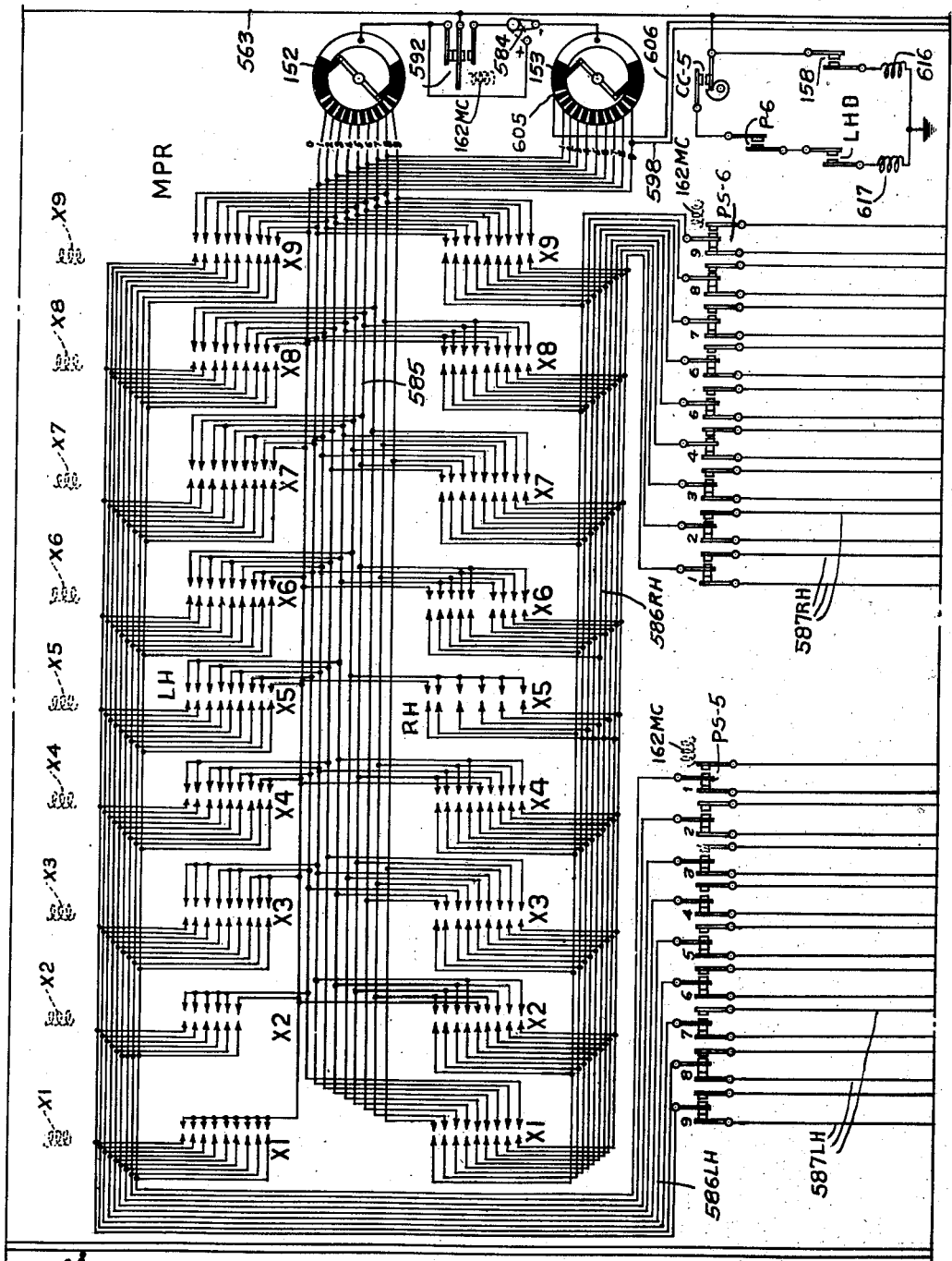

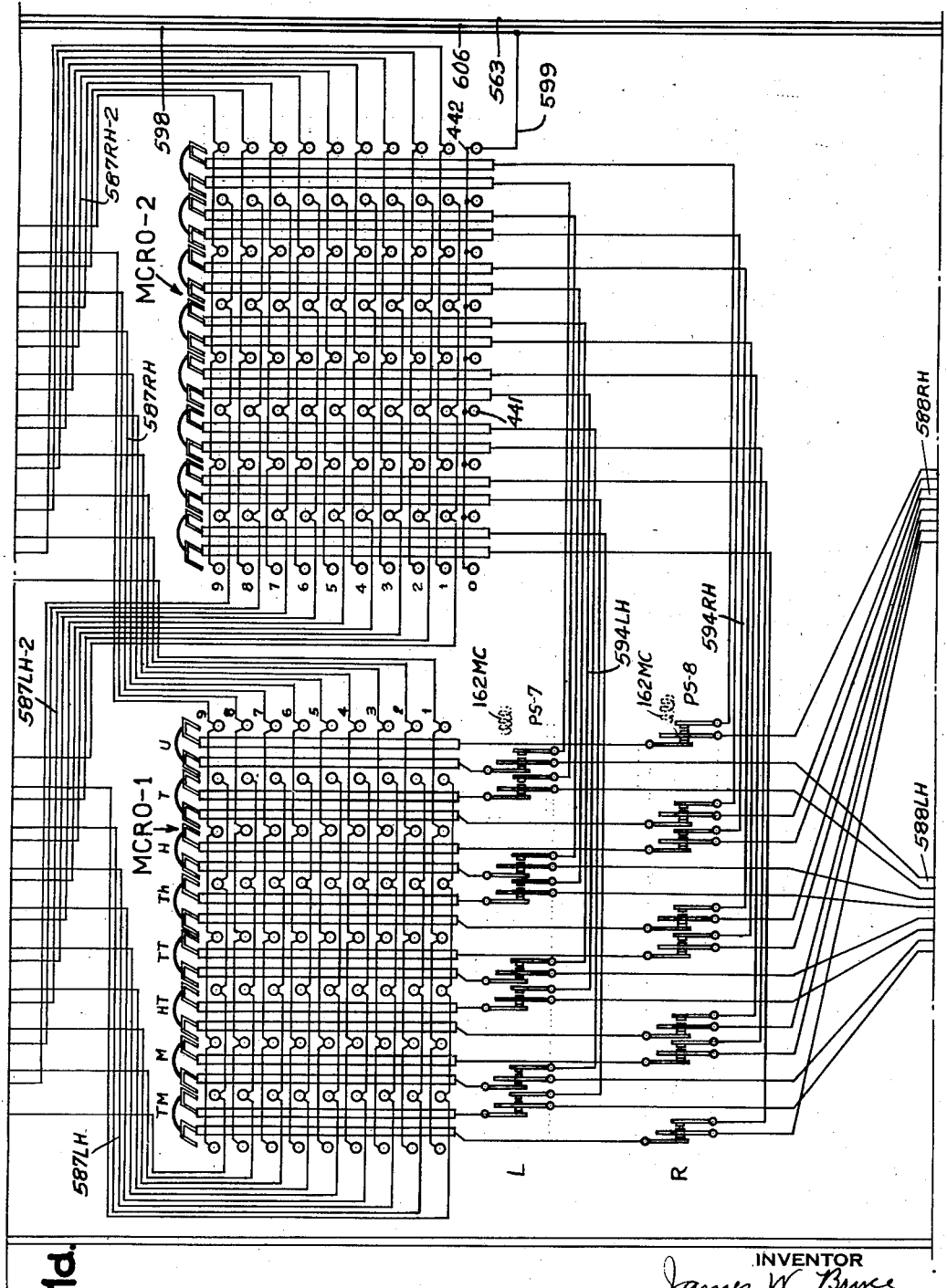

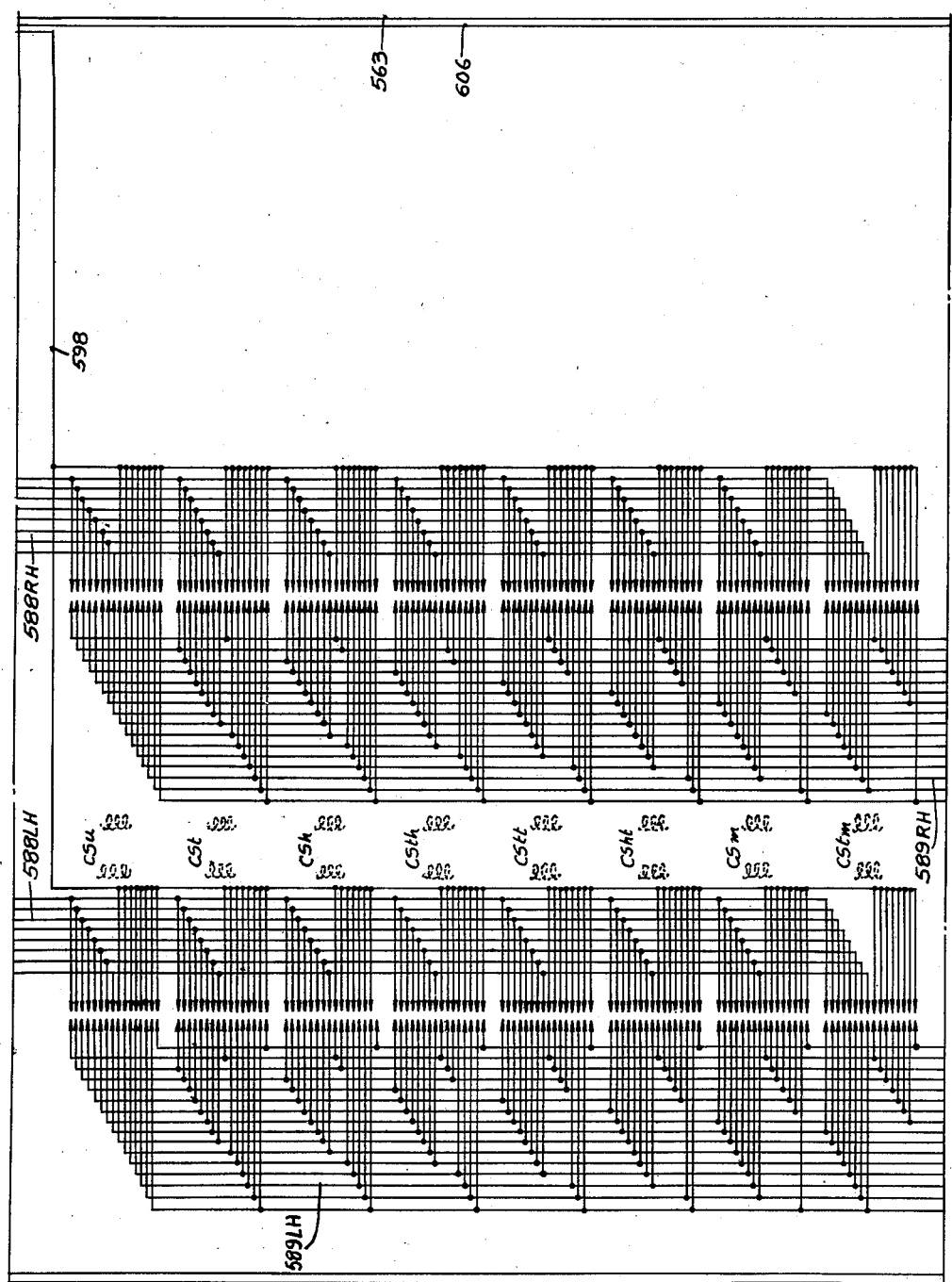

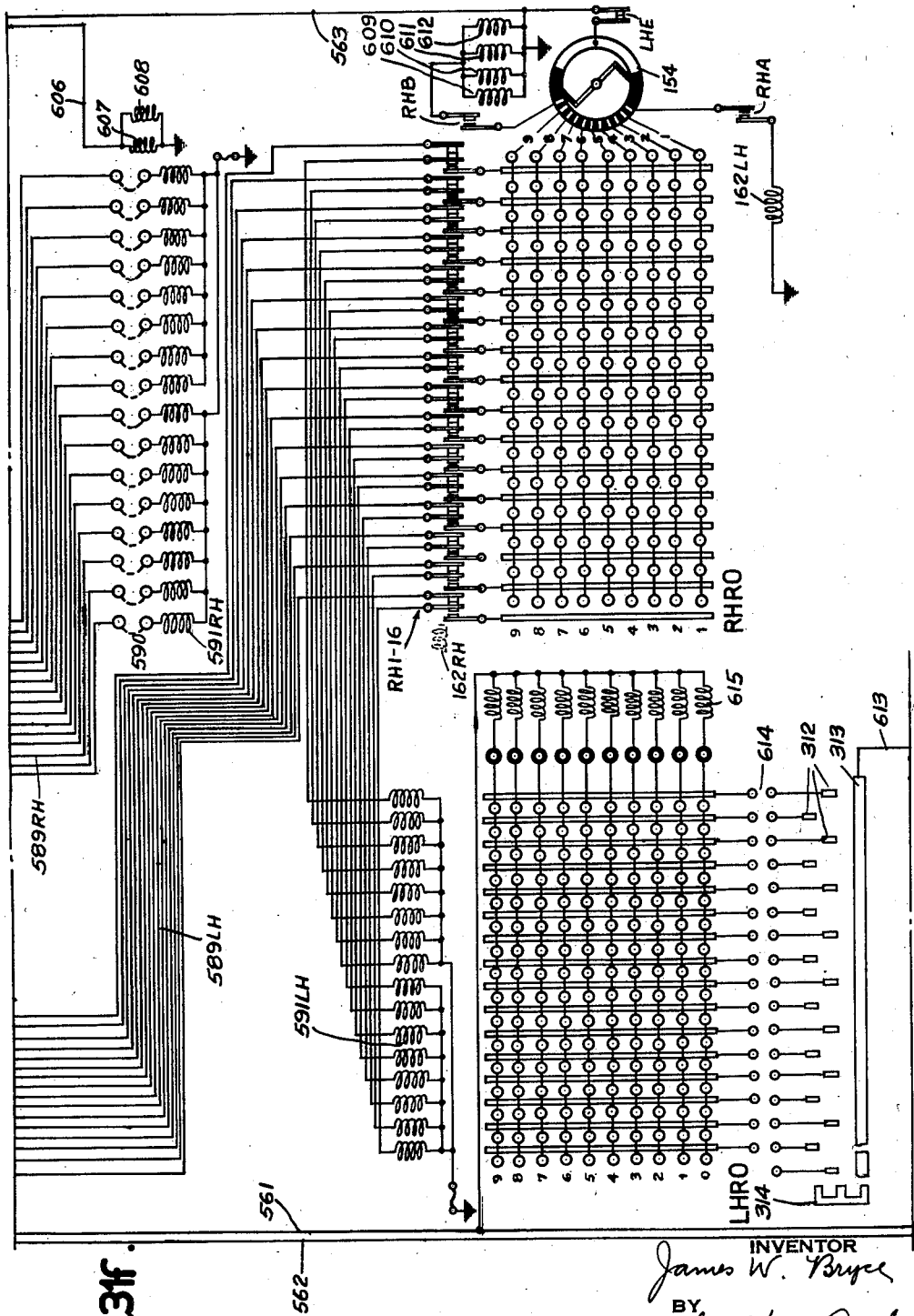

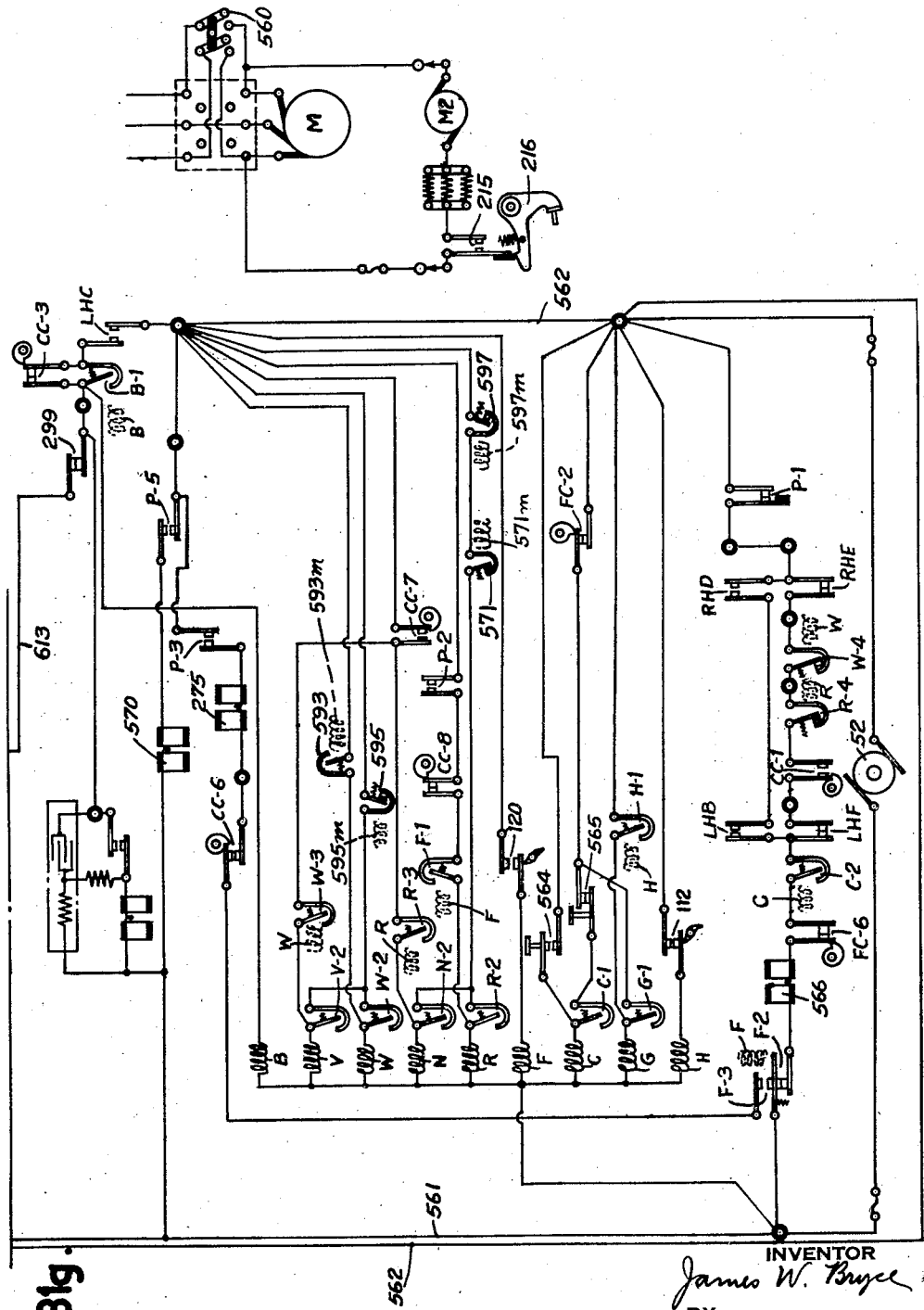

June 23, 1936.     J. W. BRYCE     2,045,436
ACCOUNTING MACHINE
Filed May 4, 1932     21 Sheets-Sheet 21

FIG. 32.

Problem:  (1) (AxB)+(CxD),   (2) (AxB)-(CxD)

Where A=2,000,000
      B=4
      C=3504
      D=506

(1)   (AxB)+(CxD) = (2,000,000 x 4)+(3504 x 506) = 9,773,024

|  | LH Accumulator | RH Accumulator |  |
|---|---|---|---|
| Line 1 (AxB) | 0000000000000000 | 0000000008000000 | Counter Cycle |
| Line 2) 3504×6 (CxD) | 0000000000013020 | 0000000000008004 | Counter Cycle |
| Line 3) 3504×5 | 0000000001202000 | 0000000000550000 | Counter Cycle |
|  | 0000000001215020 | 0000000008558004 |  |
| RH to LH Transfer | 0000000008558004 |  | Counter Cycle |
|  | 0000000009773024 Answer |  |  |

FIG. 33.

(2) (AxB) - (CxD) = (2,000,000×4) - (3504×506) = 6,226,976

|  | LH Accumulator | RH Accumulator |  |
|---|---|---|---|
| Line 1 (AxB) | 0000000000000000 | 0000000008000000 | Counter Cycle |
| Line 2 (9 Complement of Line 2 above) | 99998697 | 99991995 |  |
| Extra 9's | 9999999    9 | 99999999 | Counter Cycle |
| Extra 1's | (CxD)      1 | 1 |  |
| Line 3 (9 Complement of Line 3 above) | 99998797 | 99994499 |  |
| Extra 9's | 99999    999 | 999999   99 | Counter Cycle |
| Extra 1's | 1 | 1 |  |
|  | 9999999998784980 | 0000000007441996 |  |
| RH to LH Transfer | 0000000007441996 |  | Counter Cycle |
|  | 0000000006226976 Answer |  |  |

FIG. 34.

Where  $9_x$ - from complementary multiplication
       $9_0$ - from zero spots of multiplicand read-out
       9   - from 9's line of emitter through column shift contacts INVENTOR
James W. Bryce
BY
Cooper, Kerr & Dunham
ATTORNEYS Patented June 23, 1936

2,045,436

UNITED STATES PATENT OFFICE 2,045,436

ACCOUNTING MACHINE

James W. Bryce, Bloomfield, N. J., assignor, by mesne assignments, to International Business Machines Corporation, New York, N. Y., a corporation of New York Application May 4, 1932, Serial No. 609,063

24 Claims. (Cl. 235—92)

This invention relates to improvements in accounting machines and more particularly to improvements in multiplying machines.

More particularly the present invention is directed to the provision of a machine which will multiply two factors together and also multiply two other factors together and either add the two products together or subtract the second product from the first depending upon the setting of the machine.

A further feature of the present invention resides in the provision of means for effecting the subtraction of a second product amount from another product amount or first component, concurrently with and as an incident to the creation of the second product. By the provision of such a construction, operating time of the machine is saved since no supplemental cycle is required for effecting the actual subtraction of the second product from the first product or other amount previously set up in the machine.

A further object of the present invention resides in the provision of a record controlled accounting machine of a type adaptable for carrying out the before mentioned kinds of calculations.

A further object of the present invention resides in the provision of a calculating machine adapted to automatically perform calculations which expressed algebraically are as follows:

$$(A \times B) - (C \times D) = \text{Result}$$
$$(A \times B) + (C \times D) = \text{Result}$$

and where B=1 to perform computations according to the general form.

$$A - (c \times d) = \text{Result}$$
$$A + (c \times d) = \text{Result}$$

A further object of the present invention resides in the provision of a record controlled accounting machine adapted for automatically performing the foregoing types of calculations wherein the factors A, B, C, and D are automatically derived by the machine from records.

A further object of the present invention resides in the provision of a record controlled and record making accounting machine which automatically by the operation of the machine is adapted to derive the factors such as A, B, C, and D from records and in which the machine is adapted to automatically record the result which is desired by the machine back upon the record from which the factors entering into the computation were derived.

Further and other objects of the present invention will be hereinafter set forth in the accompanying specification and claims and shown in the drawings which show by way of illustration what I now consider to be one and a preferred embodiment of a machine incorporating the features of the present invention.

In the drawings:

Figures 1 and 1a taken together, show a diagrammatic view of various units of the machine and also show the train of the driving mechanism for driving the various units;

Fig. 2 is a vertical sectional view taken through the card handling and reading section of the machine.

Figs. 3 and 3a taken together show an isometric skeleton view of the punching section of the machine;

Fig. 4 is a sectional detail of certain of the parts in the punching section of the machine.

Fig. 6 is a side elevational view of one of the multi-contact controlling relay devices which are used in the machine, these relays being used both for multiplication control and column shift purposes;

Fig. 7 is a sectional view taken substantially on line 7—7 of Fig. 6. This view shows the parts in the armature restoring and knocking off position;

Figures 25, 26, 27:
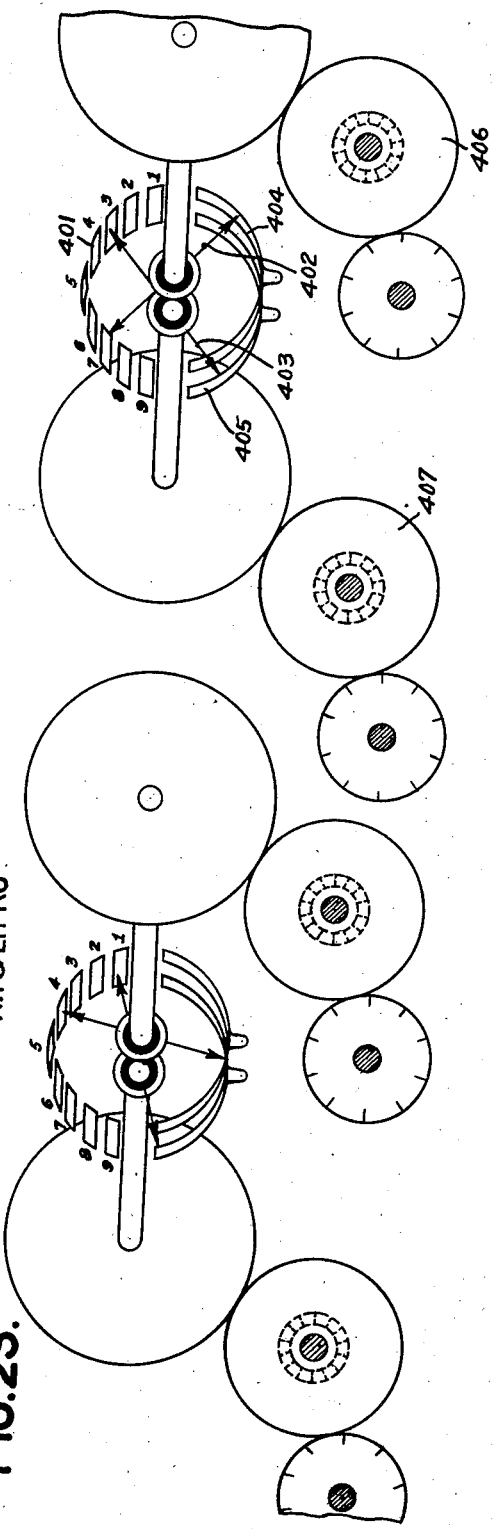
Figure 28:
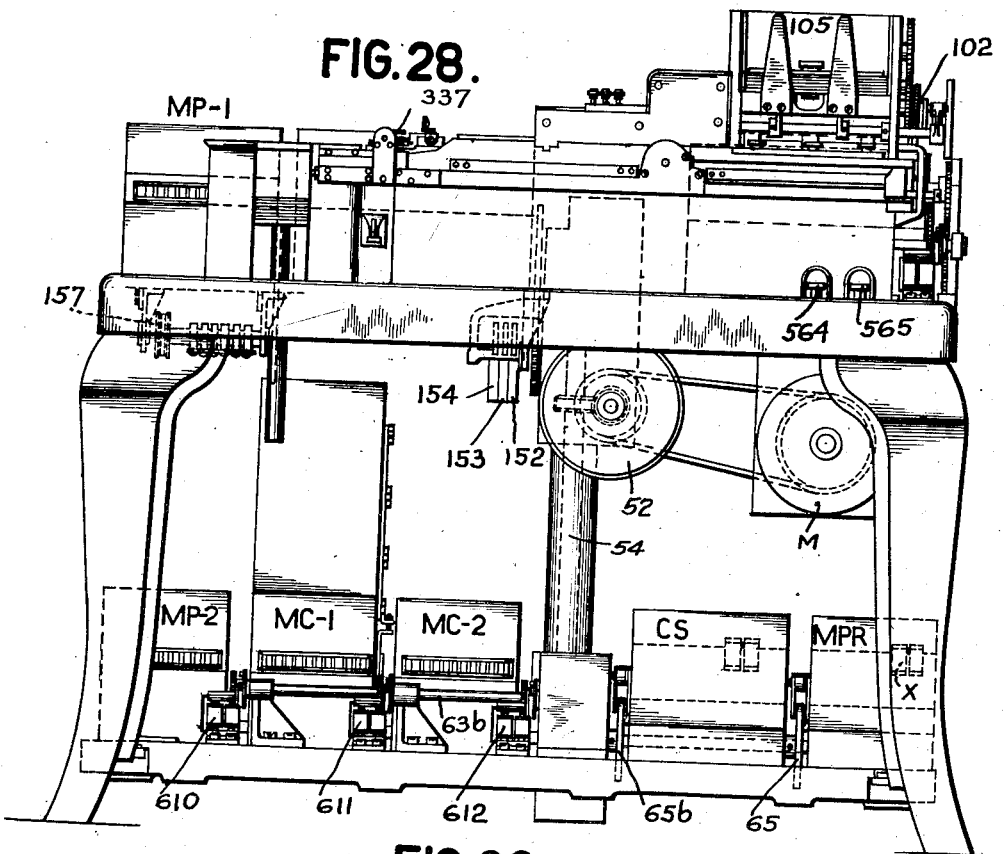
Figure 29:
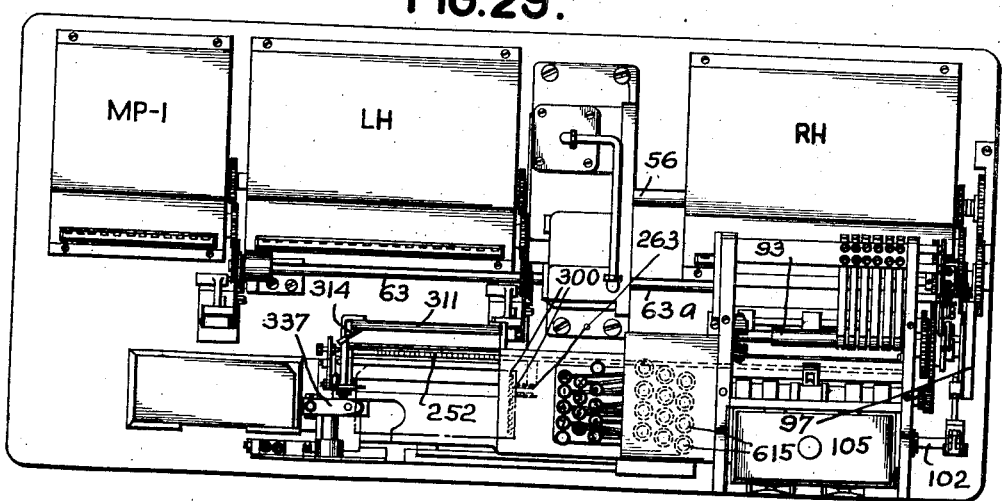
Figure 30:
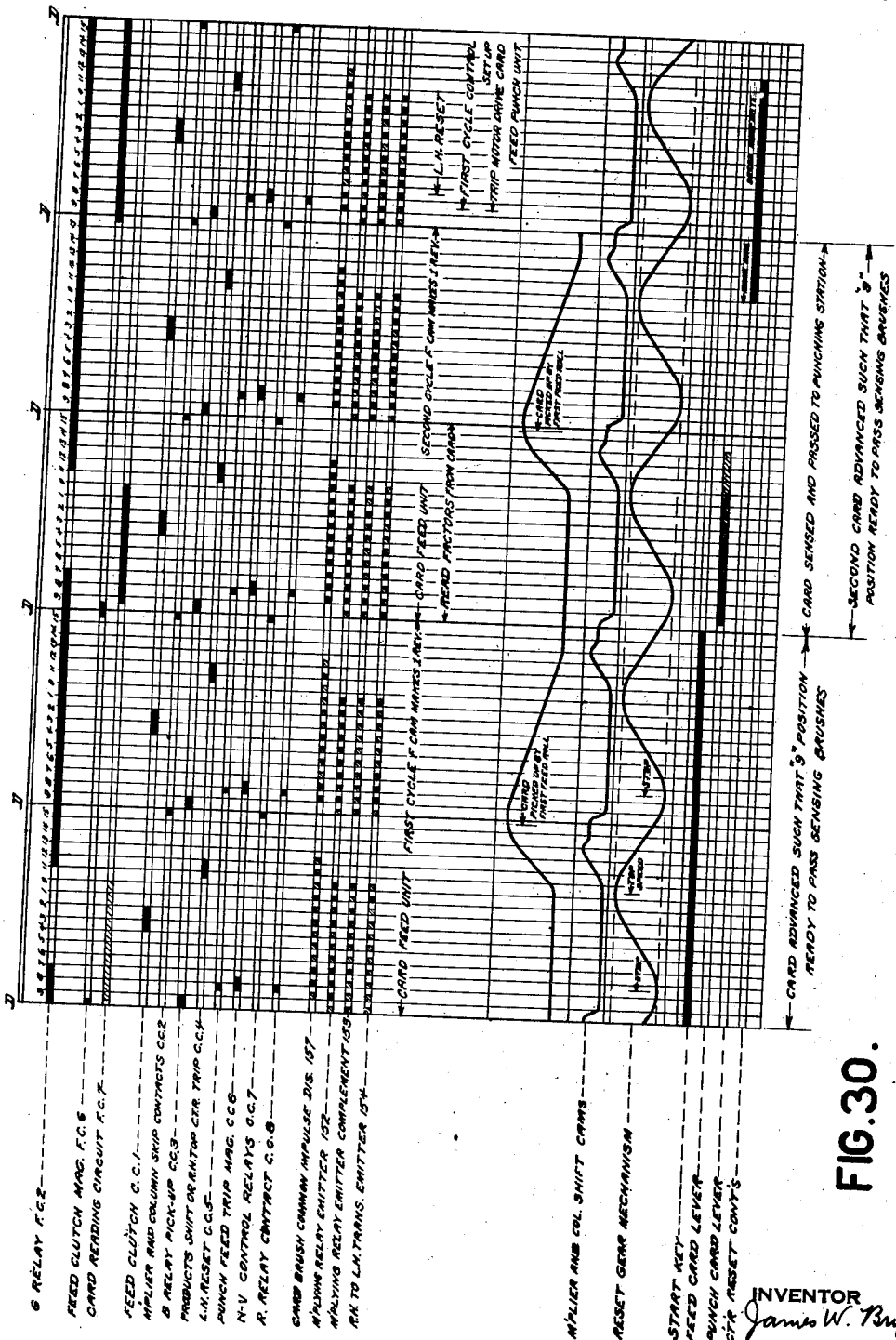
Figure 30A:
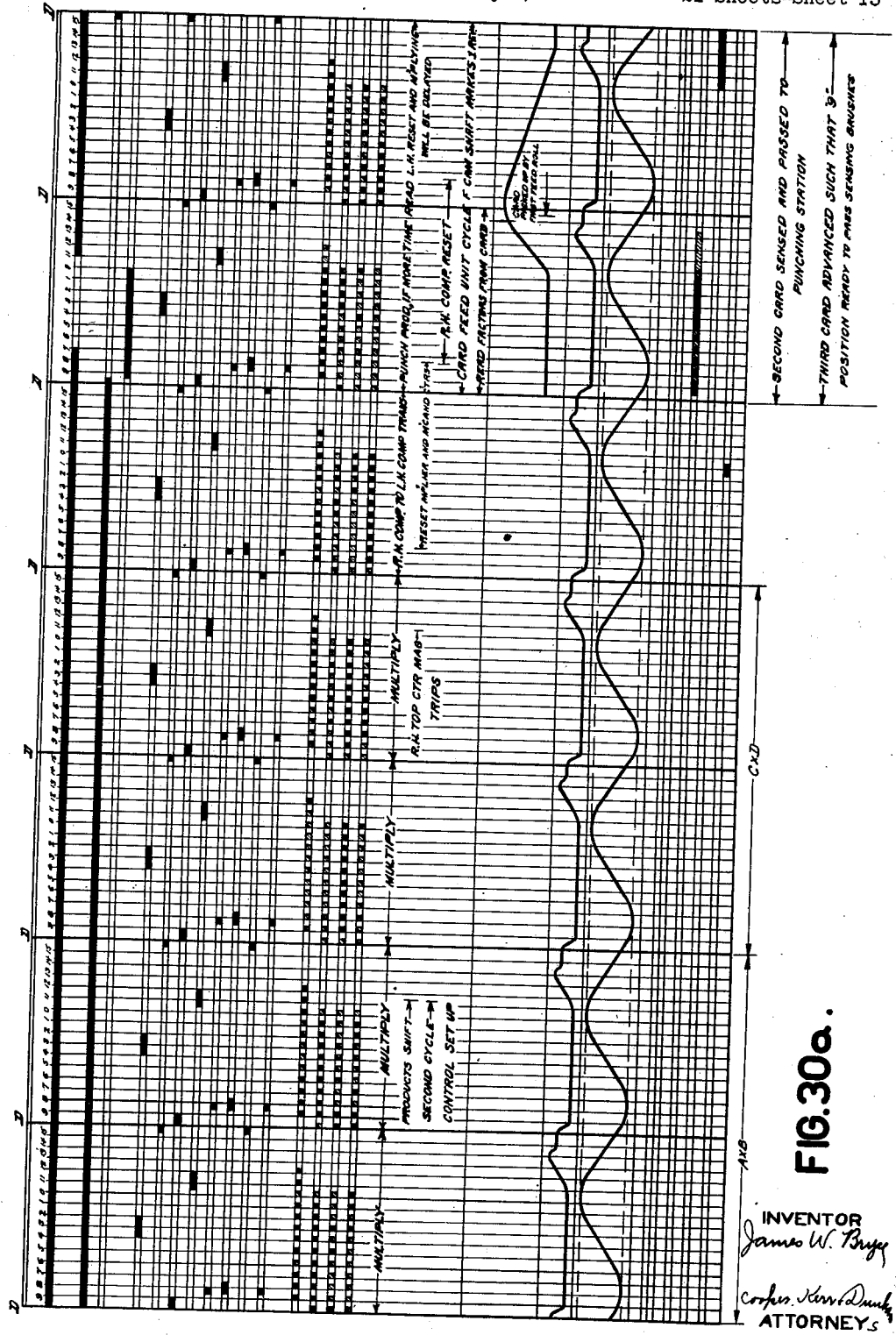

Figs. 8 to 11 inclusive, show positional views of the various parts of the electro-mechanical control relay devices and show the relation of the contacts, the armature latch, etc., in various operative positions;

Fig. 12 is a side elevational view of the operating cam and driving devices for effecting the shifting of the parts in the multi-contact control relays which are used for multiplication selecting purposes and column shift purposes. The view is substantially a section taken on line 12—12 of Fig. 6, and looking in the direction of the arrows;

Fig. 13 shows an isometric view of certain electro-mechanical or relay contacts in the RH accumulator; generally similar contacts are also provided in a relay bank for the MC—1 entry receiving device;

Fig. 14 is a view of similar contacts in the LH accumulator;

Fig. 15 is a diagrammatic view of the multiplier readout device showing diagrammatically the drive for the brushes;

Fig. 16 is a top plan view of this multiplier readout device;

Fig. 17 is a sectional view taken substantially on line 17—17 of Fig. 16;

Fig. 18 is a diagrammatic view of one of the multiplicand readout devices showing the drive for the brushes. This particular multiplicand readout device is the one associated with the MC—1 entry receiving device;

Fig. 19 is a top plan view of the MC—1 multiplicand readout device;

Fig. 20 is a sectional view taken substantially on line 20—20 of Fig. 19;

Fig. 21 is a view of the MC—2 multiplicand readout device which readout device includes zero spots;

Fig. 22 is a top plan view of the readout shown in Fig. 21, which readout is generally similar to the readout shown in Fig. 19. The view shows only a portion of the readout device and shows the wiring for the regular and zero spots;

Fig. 23 is a sectional view taken substantially on line 23—23 of Fig. 22;

Fig. 24 is a detail sectional view showing the zero spot portion of one of the segments;

Fig. 25 shows a diagrammatic view of the readout devices used for the RH and LH accumulator;

Fig. 26 is a top plan view of the readout device shown in Fig. 25 with only certain of the columns being shown;

Fig. 27 is a sectional view taken substantially on line 27—27 of Fig. 26;

Fig. 28 is a front elevational view of the machine;

Fig. 29 is a top plan view of the machine;

Figs. 30 and 30a, taken together show the timing diagram of the machine;

Figs. 31a, 31b, 31c, 31d, 31e, 31f, and 31g, taken together and arranged vertically in the order named, show the complete circuit diagram of the machine; and Figs. 32, 33 and 34 show typical computations which the machine is adapted to perform and explain the manner in which the machine carries out these typical computations.

Figure 2:
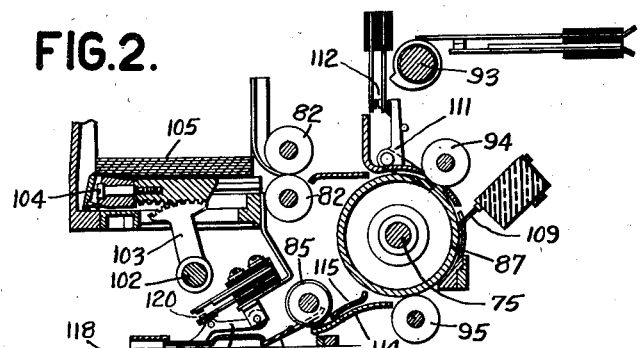

Before describing the detailed arrangement of the various parts of the machine, a general description will be given of the various units and their location in the machine. The machine embodies a card feed and card handling section which is shown in the upper right hand corner of Fig. 29 and also in the upper right hand corner of the diagrammatic view Fig. 1a. The card handling portion of the machine is also shown in section in Fig. 2. This section of the machine is arranged to feed cards and derive readings therefrom and afterwards pass the cards in the punching section of the machine. The punching section of the machine is a punch of the successive column punching type. Such punch is shown in front elevation in Fig. 29 and is also shown diagrammatically in Figs. 3 and 3a.

Figure 1:
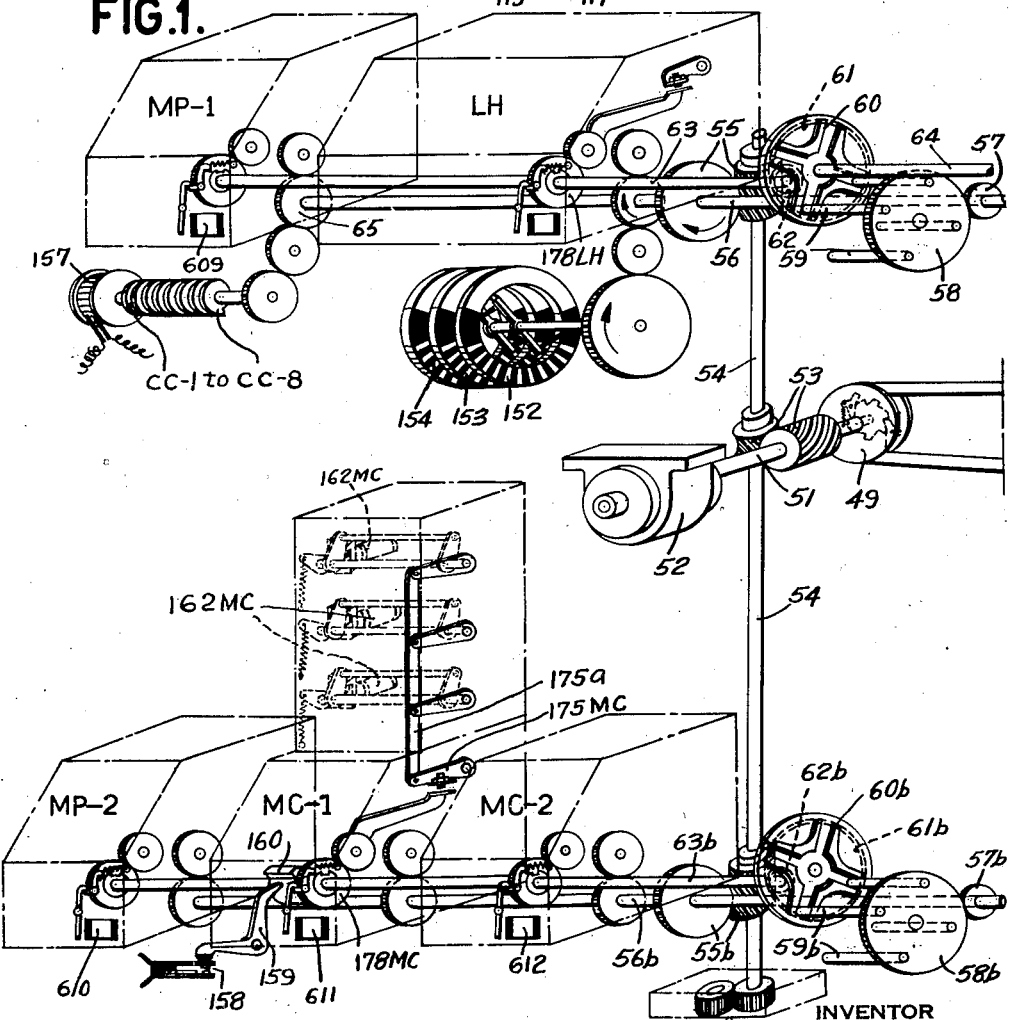

The counters and receiving devices of the machine are as follows: In the upper part of the machine as shown in Figs. 1 and 1a, there is an RH accumulator generally designated RH and an LH accumulator generally designated RH. In the upper section of the machine there is also shown one of the multiplier entry receiving devices. It may be explained that inasmuch as the present machine involves the use of two multipliers, that two such multiplier entry receiving devices are provided. The one in the upper section of the machine is designated MP—1 and another multiplier entry receiving device is disposed in the lower section of the machine and is designated MP—2. Also in the lower section of the machine there are two multiplicand entry receiving devices, such being generally designated MC—1 and MC—2.

It will be understood that the present machine involves the use of two multiplicands and there are accordingly two of these multiplicand entry receiving devices.

The machine also includes a multiplying panel relay unit which is in the lower part of the machine and which is generally designated MPR. In the lower part of the machine there is also provided a column shift unit generally designated CS.

The machine also includes a number of emitters, cam contact devices and controlling contacts which will be subsequently described in detail.

Machine drive

The machine is adapted to be driven by a constantly running motor M (Fig. 1a). This motor through a belt and pulley drive and usual one-way ratchet drive 49, drives a shaft 51 (Fig. 1) which shaft drives an A. C.-D. C. generator 52. The A. C. end of this generator is adapted to produce the impulses for actuating the various counter magnets and certain of the relay magnets in the machine and this generator 52 has a D. C. (direct current) take-off section. In short, the generator 52 is provided with both slip rings for taking off the A. C. impulses and commutators and brushes for taking off direct current.

Shaft 51, through the worm gear 53, drives a vertical shaft 54, which shaft drives the units in the upper section of the machine and the units in the lower section of the machine. The drive to the units in the upper section will be first described.

Shaft 54 at its upper end through worm gearing 55 is adapted to drive the upper counter drive shaft 56 of the machine. The LH and RH accumulators and the MP—1 receiving devices are driven from this drive shaft in the customary manner. The drive for the reset of these units is effected in the following manner. Shaft 56 is provided with a spur gear 57 driving a gear 58 with a four to one driving ratio. Drive 58 has extending from it four Geneva pins 59 cooperating with the other or cross element of the Geneva device generally designated 60. Secured to element 60 is an internal gear 61 which gear has cooperating with it a spur gear 62 mounted on the end of the reset shaft 63. The Geneva cross element 60 also has a shaft 64 which extends to another internal gear 61a similar to gear 61 and having cooperating with it an internal gear 62a similar to gear 62, which drives the reset shaft 63a for the RH accumulator units in the upper right hand part of the machine (see Fig. 1a).

The drive for the units in the lower section of the machine is substantially the same as previously described, that is the shaft 54, through the worm gearing 55b drives the lower counter drive shaft 56b. A similar Geneva drive 57b, 58b, 59b and 60b is adapted to drive an internal gear 61b which in turn drives a pinion 62b mounted on the end of the lower reset shaft 63b. The lower reset shaft 63b resets the MP—2, the MC—1 and MC—2 receiving devices in the customary manner. It may be explained that electromagnetic one-revolution clutches of the customary type are used for selectively resetting the various entry receiving devices both in the upper and lower section of the machine. The one revolution clutches are of customary type and are electromagnetically called into operation at the proper time by magnets associated with each accumulating device. The lower drive shaft 56b extends to the right and drives an operating cam 65, which cam is adapted through a follower 66 to actuate a cross sleeve and operate certain shifting mechanisms for the multiple panel relay unit contact assemblages. A similar cam 65b is also provided driven from shaft 56b, which cam through a follower 66b is adapted to actuate a cross sleeve and operate the shifting mechanism for the column shift relay units of the machine.

Card feed and card handling unit drive

Referring to Fig. 1a the shaft 56 at its extreme right hand end is provided with a gear 68 which through an idler gear 69 drives a gear 70, which through its shaft drives gear 71, which gear 71 in turn drives a gear 72. Gear 72 in turn drives a gear 73, revolvably mounted on shaft 75. Gear 73 has fixed to it one element 76 of a one revolution clutch, the complemental part of which comprises a pawl 77 carried by an arm 78 which is fixed to shaft 75. The one revolution clutch is the customary type used in tabulating machines and this one revolution clutch is engaged by the energization of the usual clutch magnet. With the one revolution clutch engaged, it will be understood that the shaft 75 will rotate in unison with gear 73 and with the one revolution clutch disengaged 73 will continue its rotation and shaft 75 will remain stationary. Gear 73 also drives an intermediate gear 79 which in turn is fixed to a gear 80, which gear 80 drives a train of gears 81, which in turn drive the card feed rolls 82 of the machine. The feed rolls 82 are constantly rotating feed rolls, the same rotating at all times when gear 73 is rotating and at all times when the main counter drive shaft 56 is rotating. Also in train with gear 79 is a gear 83 which gear constantly drives a drag roll shaft 84 having fixed thereto a pair of drag rolls 85.

It will be understood from the foregoing that the card feed rolls 82 and the drag rolls 85 constantly rotate at all times during the operation of the machine when the driving motor is in operation.

The drive of the parts from the intermittent element of the one revolution clutch will now be described.

The shaft 75 has secured to it a gear 86 and also secured to the shaft 75 is a card transfer and contact cylinder 87. As shown, the one revolution clutch element 76 is provided with two notches and the arrangement of this clutch is such that whenever the pawl 77 is engaged, the element 76 of the one revolution clutch will make one complete rotation. Accordingly, whenever the one revolution clutch is engaged the card transfer cylinder will make one complete revolution. The one revolution clutch pawl 77, however, can be engaged in either of the two notches of the clutch element 76. The one revolution clutch pawl 77 may be engaged in either of the two notches of the clutch element 76, which relation of the clutch members is provided because one counter cycle is required to traverse the card and carry it past the sensing brushes and another counter cycle is required to deliver the card through the punching section of the machine and since it is desired that the clutch parts be engageable without delay upon the counter drive shaft turning through either an odd or even number of revolutions.

Drive to intermittently actuated contacts

Gear 86 previously mentioned as being fixed to the shaft 75 drives a gear 90, which gear in turn drives an idler gear 91, driving a gear 92 fixed to cam contact drive shaft 93. Shaft 93 has secured upon it a number of cams for actuating contact devices which are generally known as the FC group of cam contacts of the machine. The arrangement of these cams is such that they make one revolution per card feed cycle in contradistinction to a counter cycle. Fixed to the shaft of gear 90 are card feed rolls 94, which rolls are spring pressed into contact with the card transfer and card contact cylinder 87. Similar spring pressed card feed rolls 95 also cooperate with the transfer contact cylinder 87 and these rolls are driven by a gear 96 in train with gear 86.

It may be here mentioned that the feed rolls 94 and 95 are preferably made of insulating material inasmuch as they at times contact with the transferring contact cylinder 87 which receives current.

Card picker drive

Shaft 75 on one end has secured to it a box cam 97, which box cam has a follower 98 cooperating therewith. The cam follower connects to a rock shaft 102, which rock shaft carries gear sectors 103. Gear sectors 103 are in engagement with the picker blocks 104 (see Fig. 2). By the engagement of the one revolution clutch the picker is called into action and the advance of the picker withdraws a single card from the magazine 105 (Fig. 2) and advances this card into the bite of the rolls 82. The rolls 82 in turn forward the card to the card transfer roll 87. A curved card guide is provided around the transfer cylinder and the advancing card is carried around by the forward rotation of the transfer cylinder and by the rotation of rolls 94 so as to be traversed under the main card sensing brushes generally designated 109 in Fig. 2. Also in cooperation with the card is a pivoted card lever 111, which lever 111 has a tail portion arranged to bear against the upper surface of the card. With the card in position under this tail of the card lever, contacts 112 will be closed.

After the card has been sensed by the main sensing brushes 109, it is advanced by the cooperation of feed rolls 95 with the transfer cylinder 87 between guiding members 114 and 115. While between these guiding members the card is advanced by the cooperation therewith of the drag rolls 85, such rolls extending downwardly into recesses of the lower members 114 in the manner shown in Fig. 1a. This arrangement of drag rolls and recesses provides for a gripping of the card and an advance of the card after it has been released by the rolls 95 so that the card may be delivered into the tray of the punching section of the machine. The drag rolls 85 (Fig. 2) deliver the card under a guide member 117 (Fig. 2) and after the card has been freed from the drag rolls the card is flipped down into the tray of the punching section of the machine. The location of the tray is generally indicated at 118 in Fig. 2 and the position of the card in this tray is indicated at R in Fig. 1a. A card lever 119 (Fig. 2) is also provided adjacent the tray portion 118 and this card lever is arranged to close card lever contacts 120 when a card is lodged in the tray of the punching section of the machine.

The foregoing description has described the manner in which a card is withdrawn from the supply magazine 105 and the manner in which the card is carried past the main sensing brushes 109 and the manner in which the card is delivered into the punching section of the machine. With the traverse of the card past the sensing brushes the amounts of the multipliers and multiplicands will have been read from the card and entered into the MP receiving devices and into the MC receiving devices. The MP receiving devices, the MC receiving devices and the LH and RH accumulators are of the usual type as customarily used in tabulating machines and are provided for electromagnetically actuated clutches. The various accumulators and receiving devices have commutator type readout devices which will be hereinafter more fully described.

*Multiplying panel and column shift relays*

The multi-contact relays which are used in this machine for controlling multiplication and effecting column shift are those of the types customarily used in electric multiplying machines of this general type. The multiplying relays are more fully described in the copending application of George F. Daly and James M. Cunningham, Serial No. 576,184, filed November 19, 1931. The multiplying relays are substantially similar to the column shift relays and a description of one relay will suffice for both as the action is identical. These multi-contact relays which are used for column shift and multiplier control purposes will now be described.

Suitable frame plates in the frame of the machine (see Fig. 6) are slotted to receive a number of vertical plates 130. Carried on each plate is a magnet which will be designated CS when the relay is used for column shift purposes and X—1, X—2, X—3, etc., when the relay is to be used for multiplier selection purposes. These magnets CS or X when energized, serve to control the relays of the multicontacts. Preferably the magnets CS or X are used as trip magnets only and the armatures of these magnets are not required to actually shift their related contacts. Furthermore provision is made for relieving the strain from the armature latches at the time of release of the armature latches.

It has been previously explained that cams 65 and 65b (Fig. 1a) are provided on shaft 56b and such cams cooperate with followers 66 and 66b. Followers 66 and 66b each have secured thereto an arm 131 which has a forked end cooperating with a stud on a serrated operating bar 132. The serrated operating bar (see Fig. 12) is slidably mounted and disposed below and at one side of the base of the controlling relay section of the machine and into the serrations of this bar extend arms 133 of a contact operating bail structure. Each arm 133 is fixed to the end of a rock shaft 134 which is suitably journalled in brackets carried by the plate 130. Fixed to shaft 134 at its opposite ends are upstanding arms 135 and 136. Arm 135 is also fixed to arm 133. Spanning 135 and 136 and fixed thereto is a cross member 137 which on its upper surface carries a strip or bail of insulating material 138 (see Figs. 7 and 8). Arm 136 extends upwardly beyond 137 and this upward extending portion of 136 will be designated 136a. Arm 136a is utilized for knocking off the armatures and it also controls certain of the latching operations as will now be described. The magnet generally designated CS or X is provided with a pivotally mounted armature 139 which is spring retracted away from the magnet by spring 140. The armature 139 also is provided with an upstanding portion 141 (see Fig. 7) which portion is in alignment with a screw 142 carried by bent over portion 143 of arm 136a.

By referring to Fig. 7 it will be noted that if the serrated operating bar 132 is in the position shown, that arm 133 will be rocked in a clockwise direction swinging arm 136a clockwise causing the screw 142 to abut against 141 and restore and knock off any previously attracted armature. Each armature 139 is provided with a latch portion 144 and pivotally supported upon member 136a upon a stud 145 is a forked member 146. As shown in Fig. 6 the forked member 146 is disposed to the left of the arm 136a and the forks of this member 146 are turned over and pass the sides of 136a. One of these forked portions is designated 147 on Fig. 6 and this forked portion extends over and cooperates with the latch point 144 on armature 139. The other fork 148 is disposed upon the opposite side of member 136a (see Fig. 7). A spring 149 is provided which is fastened at one end to the right hand fork 148 of the forked member 146, which spring is also fastened to the arm 136a. The action of spring 149 is such that it tends to rock the forked member 146 anti-clockwise with respect to 136a. After the armature has been restored and knocked off in the manner indicated in Fig. 7, the serrated operating bar 132 by its cam action is shifted slightly to the right (note the arrows at the bottom of Fig. 8). Shifting of the serrated operating bar 132 to the right allows arms 133 to follow the serrated operating bar. Such following action is brought about by the spring pressure of the set of contact blades 150. This slight movement of 133 to the right swings 136a slightly to the left to a position in which there is still clearance between part 147 and member 136a (see Fig. 8). With the parts in this position the spring strain of contacts 150 is removed from the latch point 144. The latch may now be released by attracting the armature by energizing the magnet CS or X. Upon energization of such magnet the action of spring 149 causes the forked arm 147 to snap over the top of the latch point 144, the parts now taking the position shown in Fig. 9. The next action is the actual closing of contacts 150 with 151. This is the position of parts shown in Fig. 10. With this condition of parts the cam 65 or 65b has turned to a further extent permitting a further shifting of the serrated operating bar 132. The arm 133 then swings to its extreme anti-clockwise position under the action of spring contacts 150. The insulating bail 138 moves to the left and allows contacts 150 and 151 to close.

The further operation comprises the knocking off the armature as shown in Fig. 7 by the movement of the serrated bar 132 to the left. The movement of this bar positively opens up contacts 150 and 151 against the tension of the blades 150.

Fig. 11 shows the relation of parts upon an operation when no trip of an armature has been effected magnetically. In this case the latching nose 144 cooperates with the forked arm 147 and prevents 136a swinging to the left beyond the latching point. It will be noted that 136a in this figure is in contact with the right hand side of 167. With this position of the parts the contacts 150 and 151 will be kept open.

Summarizing the above multi-contact arrangement provides the following desirable features.

Contact pressure is removed from the latch point prior to the releasing of the latch magnetically. The multiple contacts are opened by a positive mechanical action of the serrated operating bar. The armatures are positively knocked off by a positive cam operation of the serrated operating bar. The timing of contact closure under the Fig. 7 condition can be definitely controlled by the timing of the cam 65 or 65b.

Summarizing the construction provides accurate timing of contact operation with very slight load on the latch points at the time of armature actuation under energization of the control magnets CS or X.

It will be understood that in the present machine there are a number of these multi-contact relays. In the present embodiment eight of such assemblages are employed for column shifting purposes and nine of the assemblages are employed for multiplier plate relay purposes.

The machine also includes a number of emitters of conventional construction, an impulse distributor and a number of CC cam contact devices. The emitters are shown in Fig. 1 at 152, 153 and 154 and such emitters are driven from the main counter drive shaft 56 in the conventional manner. Also shown in Fig. 1 are a number of cams for operating the CC group of cam contacts. These will be designated CC—1 to CC—8 inclusive corresponding to the showing on the circuit diagram. Adjacent the CC cams and driven concurrently therewith is an impulse distributor 157. Certain contacts are associated with the MC—1 receiving device and are arranged to be shifted whenever the MC—1 receiving device is reset. Such contacts are designated 158 on Fig. 1 and such contacts are operated by a member 159 which cooperates with the cam 160, fixed to the reset drive gear 178MC of the MC—1 receiving device.

Electro-mechanical relays in the RH and LH accumulators

Fig. 13 shows relay devices in the RH accumulator. These relay devices comprise sixteen three-bladed contacts designated RH 1 to 16 inclusive and two-blade contacts, RHA, RHB, RHC, RHD, RHE and RHF, of these latter contacts RHA, RHB, RHD and RHE are normally open contacts and RHC and RHF are normally closed contacts. The contacts are released to shift to reverse position by energization of magnet 162RH, which when energized trips armature 170, releasing 171 and allowing bail shaft 172 to rock under the influence of spring 173. The bail 174 upon moving allows the contacts to shift.

Restoration of the contacts and relatching of 171 with 170 is effected by a train of levers extending to a cam on the reset gear of the RH accumulator. These levers comprise a lever 175 fixed to the bail shaft which cooperates with a lever 176 having its opposite end cooperating with a cam 177 upon the reset gear 178 of the RH accumulator.

The LH accumulator is provided with contacts which are similarly operated. The contacts proper are shown in Fig. 14 and comprise normally open two-blade contacts LHA, LHB, LHC and LHD and normally closed two-blade contacts LHE and LHF. Such contacts are released by a magnet 162LH similar to 162, which upon the circuit diagram will be designated 162LH. The restoring parts are the same construction as for the RH contacts and are operated from a cam similar to 177 fixed to LH reset gear 178LH.

Also associated with the MC—1 entry receiving device (see Fig. 1) is a multiple bank of relay contact devices. The contacts of each set of which are of three-blade type, similar to contacts RH 1 to 16 just described in connection with the description of Fig. 13. Such multiple banks of contacts are similarly controlled by bails similar to 174, which bails are latched and tripped by three concurrently energized magnets 162MC. Such sets of three-blade contacts include nine PS—1 contacts, eight PS—2 contacts, eight PS—3 contacts, one PS—4 contact assemblage, nine PS—5 contacts, nine PS—6 contacts, eight PS—7 contacts, eight PS—8 contacts, one 583 group of contacts and one 592 group of contacts. While these contacts are shown at various points on the circuit diagram, it will be understood that they will be released and shifted to a reverse position from that shown on the diagram by the concurrent energization of the three 162MC magnets. The various bails of this multiple relay bank are restored by a lever 175MC from the cam 160 on the reset gear 178MC. A suitable linkage 175a connects the various bails together so that they are operated concurrently upon the rocking of the lever 175MC.

Punching mechanism

In general the punching mechanism is of the successive column acting repetition punching type.

The punching mechanism generally is of the form shown in the Lee and Phillips United States Patent No. 1,772,186 and also of the form shown in the copending application of Lee and Daly, Serial No. 391,874, filed Sept. 11, 1929 (British Patent No. 362,529). Certain features of the punch are also shown and more fully described in the patent to Daly, 1,950,485. Other features of the punch are shown in patents to Schaaff, No. 1,803,979, dated May 5, 1931 and No. 1,821,078, dated Sept. 1, 1931.

In general it may be stated that the punching mechanism is adapted to receive a record card in the receiving tray 118 (Fig. 2), R on Fig. 3a designates a record card in this position.

The punching machine includes two card feed racks 251 and 252. 252 has suitable pusher fingers 263 attached to an arm carried by the rack 252. The punching device is driven by a separate motor M—2. This motor, through the gear train shown, drives a shaft 255 which has a ratchet shaped clutch element 262 fixed on one end of it. Alongside of 262 is a gear 255a which meshes with the lower teeth of 251. Secured to gear 255a is a disk 264. Pivoted on this disk 264 is a member 266 provided with a ratchet shaped clutch tooth 267. Alongside of member 266 is another member 266b which lacks the clutch tooth. On 266 is a pin 266c overlying an arcuate surface of 266b. The free end of 266b is connected to a toggle member 268 by a link 269. 268 is pivoted on disk 264 at 270. The opposite end of 268 remote from its pivot 270 is connected to a spring element 271. Spring 271 tends to hold the clutch tooth 267 out of engagement with the clutch teeth of element 262 and allows it to engage when 268 is shifted.

Figure 5:
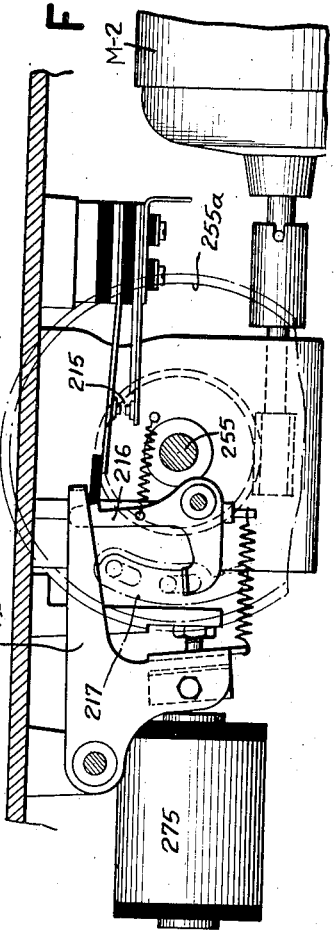
Fig. 5 is another detail of certain other parts in the punching section of the machine.

For the purpose of effecting a clutching action, punch clutch feed magnet 275 (Fig. 5) is provided. This magnet when energized attracts its armature, causing an arm 277 to engage a pin 278 (see Fig. 3a, in this figure the pin engaging extension of this arm is shown broken off for clarity of illustration of the other parts), depressing 266b and allowing 266 to descend so that the tooth 267 engages with the ratchet 262. Upon such engagement the gear 255a will be driven in a counterclockwise direction substantially a single revolution, shifting rack 251 to the left. This action, through the card pusher shown in Fig. 3a, moves the card from the R position to the R—1 position. It may be also mentioned that when magnet 275 is energized, an arm 277b on the armature of the magnet will close contacts 215. Such contacts upon closure, are latched closed by a latch 216. 216 is tripped to allow the contacts to reopen by a knock-off 217 carried on the back of gear 255a (see Fig. 3a).

At the termination of the counterclockwise movement of gear 255a, the tails 279 of parts 266 and 266b, will strike a projection 280 on a fixed plate to effect the disengagement of the tooth 267 from the ratchet wheel 262. It will be understood that the tails 279 do not actually pass the fixed projection 280 but are merely intercepted by such projection and later retreat away from this projection in a clockwise direction. This action also restores the toggle parts to normal position.

The above driving action has wound up a spring in barrel 283. Upon disengagement of the one revolution clutch 267 previously referred to, rack 251 returns to the right under the influence of the spring power of the spring in barrel 283.

The driving train to the second card carriage rack 252 will now be described. Rack 251 has its upper teeth intermeshed with gear 284. Gear 284 has secured to it a member 285 (see also Fig. 4) having a single notch or tooth disposed in the plane of a pawl 286 which is pivoted on a part 287 fixed to the shaft 288. Shaft 288 on its opposite end has a gear 289 which meshes with card carriage rack 252. Suitable mechanism shown in Fig. 4 controls the co-action of the pawl 286 with member 285 so that with the rack 251 in extreme right hand position pawl 286 will be disengaged from the clutch element 285. Such disengagement is effected by the rocking of 290 in a clockwise direction by the co-action of the pin 293 with a block 292 carried on rack 251. Upon initial movement of 251 to the left the block 292 will clear the pivoted camming element 290 allowing a slight counter-clockwise motion of it so that 286 under spring action may rock and engage the tooth of member 285. Thereafter drive will come from 251, through gear 284, through 285, to pawl 286 to 287, to shaft 288, so that a clockwise rotational movement will be imparted to 288. This action will, through gear 289, traverse rack 252 to the right. The card carriage rack 252 will thus be shifted to extreme right hand position permitting the card pushers 263 (Fig. 3) to first ride over the surface of the card under the pushers and ultimately engage back at the trailing edge of the card at the R—1 position. Rack 252 has associated therewith a spring driving device comprising the usual spring barrel generally designated 294. This spring device is wound up by the traverse of 252 to the right and causes a movement of 252 to the left under spring action. The rack 252 also has associated with it an escapement mechanism 295 having a dog 295a. This escapement is more fully described in Schaaff Patent No. 1,426,223, dated August 15, 1922, and in the Lee and Phillips Patent No. 1,772,186. Removably secured to the card carriage rack 252 is a skip bar 296 provided with a notched portion 297 which permits skip lifter lever 298 to descend when in the notch or to remain elevated when riding on the high part of the bar. When the skip lifter lever descends into the notch it allows the dog 295a of the escapement mechanism to cooperate with the ratchet teeth of rack 252. With the skip lifter lever 298 riding on the top of the skip bar 296, the escapement will be disabled so that the card carriage rack 252 can traverse without stopping at each card column until the notch 297 is reached. Thereafter there is an intermittent motion of the card carriage to the left under spring action under escapement control. When the skip lifter lever again rides out at the notch the card carriage rack 252 takes its full excursion to the left. The location of the beginning of the notch in the skip lifter bar determines the position for the beginning of result punching. When the escapement dog is lifted up certain contacts are opened as is customary in machines of this class. These contacts are designated 299.

The punching mechanism proper need not be fully described as it is fully set forth in the Lee and Phillips patent above referred to and in British Patent No. 362,529, which corresponds to the Lee and Daly United States application Serial No. 391,874. In brief, the punching mechanism comprises a number of punches 300, which punches are adapted to be depressed to actuate the card through interposers not shown under the control of the punch selector magnets. The details of the punching mechanism are also fully set forth in the copending application of George F. Daly and James M. Cunningham, Serial No. 576,184, filed November 19, 1931.

Figure 3:
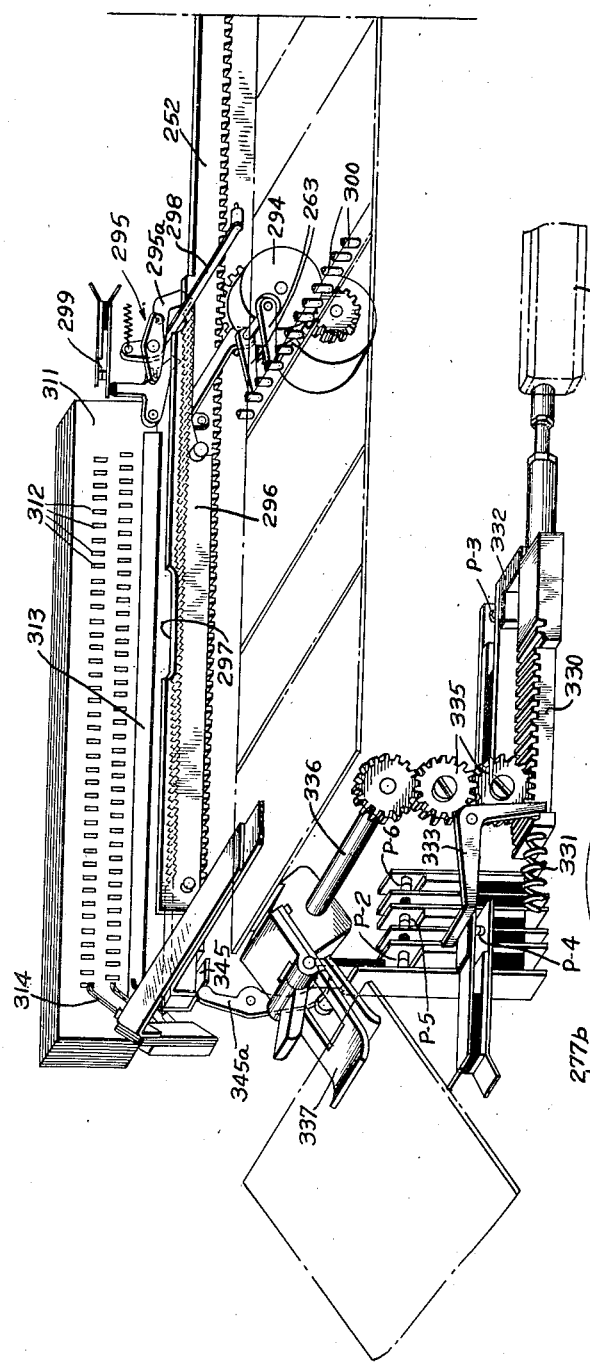

Referring to Fig. 3, disposed alongside the card carriage rack 252 and fixed to the frame of the machine, is a block or step of insulating material designated 311. Disposed in this block of insulating material are a number of spots 312 of conducting material and alongside these spots is a common strip of conducting material 313. A suitable bridging piece or multiple brush assembly 314 is carried by the card carriage rack 252 and as the card carriage rack moves the bridging brush 314 is displaced and establishes circuit connections from the common bar 313 to one of the spots 312 depending upon the columnar position of the card carriage rack 252. For accuracy of spacing, the conducting spots 312 are placed in two rows, the spots of the lower row being inter-staggered with the spots on the upper row as shown in Fig. 3.

*Card ejector*

Referring to Fig. 3, after the card has reached the R—1 position and has been traversed past the punches 300 and has been punched, it ultimately reaches a position at the extreme left hand end of the punching section of the machine from which point it must be discharged into a discharge hopper. The card eject mechanism is shown in Fig. 3 with the parts shown in the position which they assumed upon starting the machine in operation. Upon the first card feeding operation through the punching section of the machine, rack 251 will have moved towards its extreme left position. After reaching the dotted line position shown in Fig. 3, 251 moves further to the left and thrusts a rack 330 to the left compressing coil spring 331. Bearing against a shoulder on rack 330 is a contact operating part 332. When 330 is thrust to the left, contacts P—3 which were previously closed will open under their own spring action. The displacement of rack 330 to the extreme left position will through intermediate gears 335, rock a shaft 336 in a clockwise direction to bring in ejector clip assemblage 337 away from the position shown in Fig. 3 to a position in which the ejector clip can receive a card which has been advanced through the punching section of the machine. With the ejector clip assemblage 337 disposed in such card receiving position the assemblage will be latched in such position by a latch not herein shown, but which latch is fully described in British Patent No. 362,529 (see latch 216 of that patent, Fig. 16). The ejector clip latch is adapted to be released by an ejector clip magnet not shown in Figs. 3 and 3a, but shown in the aforementioned British Patent No. 362,529. The action of the ejector assemblage may be briefly stated to be as follows. Upon energization of the card eject magnet, the ejector clip assemblage which has then grasped a card, swings from the card receiving position to the position shown in Fig. 3, in which position the jaws of the ejector are opened up so that the card can be discharged therefrom.

*Contact devices in the punching section of the machine*

Contact devices P—3 controlled by 330 have been described. Also associated with the ejector end of the punching section of the machine are a pair of contacts P—4 which contacts are closed by their operating bail 333 being displaced anti-clockwise upon movement of 330 to the right and which contacts are allowed to open under their own spring action upon 333 being permitted to rock clockwise upon movement of 330 to the left hand position.

An extension 345 on rack 252 is adapted to shift a pivoted contact actuator 345a to close last column contacts P—2, P—5 and P—6 when rack 252 is beyond the last column position and to allow these contacts P—2, P—5 and P—6 to open when the rack 252 moves to the right of any of its other positions.

Referring to Fig. 3a, 120 are card lever contacts previously described and controlled by card lever 119. Such contacts 120 are closed whenever a card is present in the R position. Also at the right hand end of the punching section of the machine are contacts P—1. These contacts are normally closed with the rack 251 in the position shown and such contacts automatically open up upon movement of 251 to the left from the position shown. They furthermore remain open during the complete traverse of 251 to the left and back to its starting position.

*MP readout*

Referring to Figs. 15, 16 and 17 inclusive, 410 is a clutch gear pertaining to the units order of the MP receiving device. Gear 411 is driven from this clutch gear and this gear in turn drives two brush assemblages, one designated 412U, which traverses a set of segments 413 and also a current supply segment 414. There is another brush 415U driven by gear 411, which traverses a segment generally designated 416, which segment is provided with a single conducting segment spot at the zero position. Brush 415U also traverses a common supply segment 417. There is a similar brush 415T which is positioned from the tens order clutch wheel 418 and which also traverses the segment 416 which contains only the single conducting spot at the zero position. Brush 415T also traverses a separate common current supply segment 419. Similarly there is a brush 412T driven in unison with brush 415T which traverses the segment spots 420 and which receives current from the common current supply segment 421. This arrangement of brushes and segments is repeated for higher orders in the MP readout device, i. e. each alternative segment 424 is like 416 with only a single spot in the zero position on each segment. Alternating with these segments are other segments similar to 413 and 420 with a multiplicity of spots on each segment.

Referring to Fig. 16, the 1 to 9 segment spots of the 413 and 420 segments and alternating segments of this type, skipping the intermediate segments of the zero spot type, are wired together by transverse bus connectons, generally designated 422. Likewise on the other alternate segments such as 416, 424, etc. (which contain only zero spots), the zero spots of such set of segments are wired together by bus connections 425.

*MC—1 and MC—2 readouts*

Referring now to Figs. 18, 19 and 20, which show the MC—1 readout device, in Fig. 18 there is shown diagrammatically the brush driving arrangement for the MC—1 readout. In this embodiment the units clutch gear train 426 drives a units brush 427U which cooperates with a set of segments 428 which receive current from a common conductor segment 429. Similarly the units driving train 426 drives a brush 430U receiving current from a conductor segment 431 and cooperating with segments 432. Also cooperating with segments 432 is another brush 430T receiving current from 433 and driven by the tens order train 434. This train 434 also drives a brush assemblage 427T which cooperates with the segments 435 and receives current from the segment 436. The arrangement thus described is repeated for relatively higher orders of the readout devices.

Referring now to Fig. 19, this figure shows the cross-wiring arrangements for the MC—1 readout device. The 1 to 9 spot of segment 428 are shown connected to the 1 to 9 spots of the 435 set and the 1 to 9 spots of the 432 set are shown connected to the 1 to 9 spots of the 438 spots skipping over alternately the set of spots to the left. These bus connections are respectively indicated by the wires generally designated 439 and 440.

The MC—2 readout device is generally similar to the MC—1 readout device just described, except that zero spots are provided on each segment 428, 432, 435, etc., and such zero spots are designated 441. Such zero spots are all cross-wired as shown in Fig. 22 by a cross wire 442. Like zero spots are provided on all of the various segments of the MC—2 readout device.

*RH and LH readouts*

Figs. 25, 26 and 27 show the general arrangement of the readout for the LH and RH accumulators. With this readout mechanism it will be noted that the segment spots 401 are common to two sets of brushes designated 402, and 403 respectively and which brushes cooperate respectively with conducting segments 404 and 405. Brush 402 as shown in Fig. 22 is driven from the units order clutch gear 406. Brush 403 is driven by the tens order clutch gear 407 by the gearing diagrammatically illustrated. A similar arrangement of brushes and readout spots is provided for the relatively higher orders of the RH and LH accumulator readouts. The various segments of the readout mechanism are transversely connected by transverse buses generally designated 408 in Fig. 26.

*General operation*

Before describing the circuit diagram in detail a general description of the operation of the machine will be given which will be helpful in understanding the subsequent detailed description of the operation in the explanation of the circuit diagram. Cards are placed in the machine with amounts representative of A, B, C and D, prepunched thereon. It will be remembered that the problem which the machine is to handle is to derive these four factors or amounts A, B, C and D from a card and to multiply the factors A and B together and then to add or subtract from the product thus obtained another product which is $C \times D$. The machine is preset by switches according to whether it is desired that the second product be added to or subtracted from the first product. For speed of operation the partial products which are obtained in the operation of the machine are entered into the LH accumulator and the RH accumulator concurrently and such partial products are ultimately gathered together in the LH accumulator. Accordingly the machine in handling the portion of the problem which involves the $A \times B$ computation, enters the LH components of the partial products in the LH accumulator and enters the RH components of the partial products in the RH accumulator. If the machine is preset to handle the problem $A \times B$ plus $C \times D$, the LH components of the partial products of $C \times D$ are entered into the LH accumulator and the RH components of this product are entered into the RH accumulator. Finally upon gathering together of all these partial products into the LH accumulator, the result of the computation $A \times B$ plus $C \times D$ will be set up and represented in the LH accumulator.

When the machine is set for a subtracting operation, i. e. to handle $A \times B$ minus $C \times D$, the procedure with respect to the $A \times B$ part of the computation is the same as before. However, when the other part of the computation is performed a different course of procedure is followed. In place of multiplying $C \times D$ and then subtracting the product from the previously obtained product of $A \times B$, the machine proceeds by obtaining "complemental" partial products of $C \times D$, that is, the machine immediately and as an incident to the multiplying computation of $C \times D$ sets up in the LH and RH accumulators an amount which is the complement of the partial products in each case. The machine is provided with means whereby during the multiplication of $C \times D$ the multiplied partial product amounts as actually obtained as an incident to the multiplying computation are not the actual partial products of $C \times D$, but are the nines complements of such partial products. The nines complements of the partial products are obtained by the multiplying operation. Thereafter provision is made for adding an extra 1 into the nines complements of partial products obtained by the multiplying computation so that the final amounts which are ultimately entered into the LH and RH accumulators are the true or tens complement of the partial products of $C \times D$. After these true tens complements of $C \times D$ have been entered into the LH and RH accumulators there is a gathering together operation. The amounts which stood on the RH accumulator are entered over into the LH accumulator so that finally the LH accumulator will have standing thereon the result of the computation $A \times B$ minus $C \times D$.

Provision is made in the present machine for entering all of the factors A, B, C and D concurrently into the machine. The machine then by an automatic procedure and operation multiplies first $A \times B$, setting up the partial products on the RH and LH accumulators and thereafter multiplies $C \times D$ setting up directly the complemental amounts of this product.

While in the present embodiment the order of procedure is to enter $A \times B$ first and thereafter multiply $C \times D$, it will be obvious that such sequence is not essential and the complemental amount of $C \times D$ can be entered first and the $A \times B$ product entered subsequently. After the result has been entered into the LH accumulator, the machine proceeds in the usual way to read out the amount standing on the LH accumulator and to punch this amount on the record card from which the factors or items A, B, C and D were derived.

*Circuit diagram*

Cards punched with the factors or items A, B, C and D are placed in the card supply magazine of the machine. The machine is then set in operation, which is effected by closing switch 560 (Fig. 31g) providing a source of current supply from the main driving motor M. Rotation of the motor M starts the drive of the A. C.-D. C. generator 52 and supplies direct current to the D. C. buses 561 and 562. Alternating current impulses are likewise impressed upon bus 563 and to ground (Fig. 31a). Start key 564 is now depressed which completes a circuit from the 561 side of the D. C. line, through the relay coil C and back to the 562 side of the D. C. line. Upon closure of the start key contacts, a stick circuit is established through points C—1 of the relay C, through the stop key contacts 565 now closed and back through cam contacts FC—2 now closed to the other side of the line. The energization of coil C also closes relay points C—2 and a circuit is established traced as follows. From the 561 side of the D. C. line, through contacts F—2 now closed, through main card feed clutch magnet 566 (see also Fig. 1a), through cam contacts FC—6 now closed, relay points C—2 now closed, contacts LHF now closed, through cam contacts CC—1 which close at the proper time in the cycle, through relay points R—4 now closed, through relay points W—4 now closed, through RHE now closed, through punch rack contacts P—1 which are now closed and back to the other side 562 of the D. C. line. It may be explained that relay points R—4 and W—4 are open during multiplication, but at other times such contacts are closed. It may be further explained that contacts P—1 are only closed when the feed rack of the punch section of the machine is in the right hand position. The P—1 contacts prevent starting of the card feed in the main card handling section of the machine when the rack in the punch section is not returned all the way back to proper position. A card feed of cards in the main card handling section of the machine now ensues and a card is ultimately carried down into the card tray of the punching section of the machine. During the transit of the card to this position card lever contacts 112 are closed. Closure of these card lever contacts energizes relay coil H and picks up relay points H—1. The closure of relay points H—1 in turn energize coil G which in turn picks up relay points G—1 establishing a circuit from the 561 side of the line through coil G, relay points G—1 and back through cam contacts FC—2 to the other side of the line. The start key 564 may now be released and the main card feed will continue. Cam contacts FC—2 keep coil C energized when card lever contacts 112 open between cards, but in the event that the cards cease to feed, 112 open up and remain open until cam contacts FC—2 open whereupon relay coil C is de-energized and relay contacts C—2 open to stop the card feed.

It has been explained before that the main card feed of the machine is arranged to permit the use of constantly running feed rolls in the machine for all feed rolls except those which are associated with the card and contact roll 87. The arrangement of the feed is such that after starting the card feeding operation, the card feed and card handling unit will normally run during two counter cycles. However, when starting the machine and when cards are first placed in the card magazine it is necessary to hold down the start key 564 during the first complete card feed cycle or alternatively it may be necessary to depress the start key a second time. The first card feed cycle will pass the first card over the top of the transfer roll and at the end of the first cycle the 9 index point position of the card will be about ready to pass under the brushes 109. At the beginning of the second card feed cycle the card traverses the reading brushes 109 (Fig. 31a) and the B and D multiplier amounts and the A and C multiplicand amounts are entered into the MP—1, MP—2, MC—1 and MC—2 receiving devices.

The entry circuits will now be traced. The passage of the card through the card handling section of the machine will close card lever contacts 112, energizing relay coil H as before explained. Energization of coil H closes points H—2 (Fig. 31a). Current accordingly flows from the 563 side of the A. C. line, through H—2 now closed, through cam contacts FC—7 now closed, through the impulse distributor 157 and, at the proper index points in the cycle of the machine, to card transfer and conductor roll 87, thence through brushes 109A pertaining to the multiplicand amount A, brushes 109B pertaining to the multiplier amount B, brushes 109C pertaining to the multiplicand amount C, brushes 109D pertaining to the multiplier amount D.

The customary plug board is provided and plug connections extend the brush circuits to the MC—1, MP—1, MC—2 and MP—2 entry receiving devices. The counter magnets of these receiving devices are correspondingly designated on Fig. 31a.

By the foregoing entry operations the two multiplier and multiplicand amounts will be set up in the MP—1 and MP—2 receiving devices and in the MC—1 and MC—2 receiving devices and the readout devices of these four entry receiving devices will have been correspondingly set. After a card has had the amounts A, B, C and D read therefrom, it finally passes into the tray of the punching section of the machine and when in this position it closes card lever contacts 120 (Fig. 31g). Closure of card lever contacts 120 cause energization of relay coil F and the energization of coil F opens contacts F—2 and closes contacts F—3. The opening of contacts F—2 interrupts the supply of current to the main card feed clutch magnet 566 and a suspension of the card feed occurs in the main card handling section of the machine.

It will be understood that in starting the machine the racks 251 and 252 will be in the position shown in Figs. 3 and 3a, that is, the rack 251 will be in its extreme right hand position and the rack 252 will be in its extreme left hand or last column position. Accordingly, last column contacts P—2, P—5 and P—6 will be closed. Therefore on starting the machine and since contacts P—5 are closed, the usual eject magnet 570 becomes energized and the card eject assemblage 337 assumes the position shown in Fig. 3. When the first card, which is handled, is in the punch, the punch having its parts in the relation shown in Figs. 3 and 3a, contacts 120 become closed. At this time contacts P—3 and P—4 are also closed. The closure of contacts 120 causes the energization of relay coil F. Energization of coil F opens relay points F—2 and closes relay points F—3. Accordingly, a circuit is established from the 561 side of the D. C. line, through F—3 now closed, through CC—6 which closes at the proper time in the cycle, through punch feed clutch magnet 275, through contacts P—3 now closed and back to the other side of the line. Energization of 275 closes contacts 215 which are latched up by latch 216 and the punch driving motor M—2 is set in operation thus feeding the card towards the punching position. The machine is now ready for its various computing operations.

It has been previously explained how coil F is energized by the closure of the card lever contacts 120 in the punch. At the time this coil became energized, contacts P—2 (last column contacts of the punch) were closed, a circuit is accordingly established through relay points F—1 which are closed by energization of F through a path traced as follows. Through coil R, through relay points F—1, through cam contacts CC—8 now closed, through P—2 now closed to the other side of the line. Upon energization of relay coil R, relay points R—2 are closed which established a stick circuit through R, through R—2, through relay points 571 and 597 now closed to the other side of the line.

The energization of coil R (Fig. 31g) also closes relay points R—1 (Fig. 31b). Closure of relay points R—1 supplies direct current to the cycle controlled circuits from D. C. main 562. Alternating current is supplied to the A. C. control circuits of the cycle controller and column shift in the following manner. Energization of coil R closes relay points R—3 (Fig. 31g) and upon closure of cam contacts CC—7 coil N becomes energized. The energization of N closes relay points N—2 and establishes a stick circuit for N which maintains N energized upon opening up of CC—7. The energization of coil N closes relay points N—1 (Fig. 31b) and establishes the A. C. circuit from the A. C. bus 563 to the column shift section of the cycle controller.

Referring to Fig. 31b, the cycle controller is generally similar to the cycle controller and zero column skipping arrangement fully described in the application of James M. Cunningham, Serial No. 606,585, filed April 21, 1932.

It includes a number of Y relays, Yu, Yt, Yh, etc. controlling correlated stick circuit relay points Yu—1, Yt—1, Yh—1, etc. and also controlling shifting points Yu—2, Yt—2, Yh—2, etc. The cycle controller and zero column skipping arrangement is controlled from the MP readout devices. It has been previously explained that there are two MP entry receiving devices, viz. MP—1 and MP—2 and there are accordingly two MP readout devices which on the circuit diagram are shown in Fig. 31a. Such MP readout devices are respectively designated MPRO—1 and MPRO—2. For clarity in the circuit diagram the zero spots are shown dotted on the MPRO—1 and MPRO—2 readout devices (Fig. 31a). Such zero spots correspond to the zero spots shown on Fig. 15. For simplicity of the wiring diagram such zero spots which are actually associated with the MPRO—1 and MPRO—2 readout devices are shown repeated on Fig. 31b in closer relation to the circuits of the zero column skipping control. Such repeated zero spots on this Fig. 31b are labeled with the legend zero spots MPRO—1 and MPRO—2. It will be understood that inasmuch as two multipliers are used in the machine that selective switching arrangements must be provided to first direct current to the MPRO—1 readout and afterwards direct it to the MPRO—2 readout to the zero spot section thereof. For this purpose a three-blade contact group PS—4 is provided, which when in the position shown in Fig. 31b, allows current to flow from one side of the D. C. line 562, through relay points R—1, via circuit 580, through PS—4 in the position shown, zero spot wiring 425 to the zero spots of the MPRO—1 readout. Later on in the operation of the machine when the reading is to be taken of the second multiplier amount, from the MPRO—2 readout, the three-blade contact PS—4 will be shifted by energization of its 162MC magnet and supply current to the zero spots of the MPRO—2 readout. Other shifting contacts are the group designated PS—3 and the group designated PS—2 on Fig. 31b and the group designated PS—1 on Fig. 31a. The three-blade contacts PS—1 when in the position shown control the X magnets from the MPRO—1 readout. When shifted to opposite position they control the same group of X magnets from the MPRO—2 readout. The PS—2 group of three-blade contacts on Fig. 31b, when in the position shown, inter-relate the column shift CS magnets with the MPRO—1 readout device and when these contacts PS—2 are shifted to reverse position they inter-relate the MPRO—2 readout device with the CS or column shift magnets. The PS—3 group of contacts inter-relate the cycle control relays Yu, Yt, Yh, etc., with the zero section of the MPRO—1 readout or the zero section of the MPRO—2 readout. The cycle controller is for the purpose of skipping columns in which a zero appears in the multiplier. This cycle controller embodies relay coils Yu, Yt, Yh, etc., which when energized, close their corresponding stick contacts Yu—1, etc. and which when energized, also shift their corresponding control contacts Yu—2, etc. Contacts CSu—3, etc. are associated with the column shift multi-contacts CSu, etc., and are closed upon energization of the corresponding CS magnets and release of the multi-contact relay points. The operation of this zero skipping control need not be described in detail as the same is described in the copending application of James M. Cunningham, Serial No. 606,585, filed April 21, 1932. It is sufficient to state that if a significant figure appears say in the units order of the MPRO—1 readout that the units order column shift control relay Yu will not be energized. The Yu—2 contacts will not be shifted and upon closure of relay points N—1, in the manner previously described alternating current will flow from 563 through N—1, through the Yu—2 contacts, through the CSu column shift control relay magnet, through the units order of the PS—2 contacts, in the position shown, up to the common conducting segment 414 pertaining to the units order of the MPRO—1 readout, thence via the brush 412U of this readout over to say the sixth spot, if 6 appears in the units order of the multiplier. Thence over to the X—6 magnet, through the corresponding PS—1 contact and back to ground through CC—2 which closes at the proper time in the cycle of the machine. Energization of X—6 controls the multiplying computation for the amount 6 and also CSu becomes energized causing CSu—3 to become closed. Closure of CSu—3 causes energization of Yu and Yu upon energization shifts Yu—1 and establishes a stick circuit for Yu and shifts Yu—2 to carry the control over to the next higher order column. The multiplication continues on the successive relatively higher orders of the multiplier until the last of the Y—2 contacts, viz. the Ytm—2 contacts have become closed. Thereupon current flows through the circuit path 581, through cam contacts CC—4 (Fig. 31b), through switch 582 which is in the position shown for an A×B, plus or minus C×D computation, down through the three-blade contacts 583 to the group of the three 162MC magnets and also to the coils of relay magnets 571m and 593m and back to ground. The energization of magnets 162MC will have released the sets of three-blade contacts designated PS—1, PS—2, PS—3 and PS—4 so that for the next multiplying set of computations the readings are taken from the MPRO—2 readout, the MPRO—1 readout being cut out of circuit. The succeeding multiplying computations are the same as before for the amounts represented on the MPRO—1 readout.

The energization of the X magnets under the control of the MP readout devices releases the proper contacts of the multiplying panel plate relays MPR (see Figs. 31c and 1a) and at the proper time in the cycle of the machine current flows from the A. C. line 563, through three-blade contacts 592, which are in the position shown, for the multiplication of A×B, thence to the 152 emitter, which emitter impresses impulses upon the group of lines generally designated 585, thence through the proper LH and RH relay points of the multiplying relays MPR to the LH lines generally designated 586LH and to the RH lines generally designated 586RH, thence down through the three-blade contacts designated PS—5 and PS—6 which are in the position shown for the multiplication of A×B, through the group of lines designated 587LH to the MCRO—1 readout (Fig. 31d) and through the group of lines generally designated 587RH to this same readout, thence out from the readout through the PS—7 contacts and the PS—8 contacts which are in the position shown for the multiplication of A×B, to the group of lines designated 588LH and 588RH (see also Fig. 31e), thence through the multi-column contacts of the CS relays respectively to the lines 589LH and 589RH, lines 589RH through the plug board connections generally designated 590 (Fig. 31f) connect over to the counter magnets of the RH accumulator which are generally designated 591RH and back to ground. Lines 589LH extend through the three-blade contacts RH—1 to 16 and finally go to the LH counter magnets designated generally 591LH. Entries of the partial products of A×B are effected concurrently into the LH and RH accumulators in the customary manner.

In the event that the second product is to be added to the first product, the switch 584 (Fig. 31c) is disposed in the plus position. Upon the complete entry of the partial products of the first product of A and B into the LH and RH accumulators, the entering operation is terminated by the making up of the circuit through 581 (Fig. 31b), which circuit extends through cam contacts CC—4, switch 582, which is in the position shown, when there is to be a second $C \times D$ product entering operation, through contacts 583 and back to ground through the three 162MC magnets and through the coils 571m and 593m. The energization of magnets 162MC releases the three-blade contacts PS—1 so that they shift and inter-relate the multiplier control relay magnets X 1 to 9 with the MPRO—2 readout device (Fig. 31a). The three-blade contacts PS—2, PS—3 and PS—4 also shift to the reverse position from that shown in the circuit diagram so that the cycle controller and column shift control magnets are also inter-related with the MPRO—2 readout (Figs. 31a and 31b). Three-blade contacts PS—5 and PS—6 also shift to the reverse position from that shown so as to inter-relate lines 586LH and 586RH with lines 587LH—2 and 587RH—2 which extend to the MCRO—2 readout device (Fig. 31d). It will be understood that before shifting these contacts the aforesaid lines extended to the MCRO—1 readout. It will be remembered that the MCRO—2 readout is provided with zero spots 441. It may be explained that the zero spots 441 do not effect any control upon a computation of the typical form $A \times B$ plus $C \times D$, but such zero spots 441 in the MPRO—2 readout are utilized only on computations of the general form $A \times B$ minus $C \times D$ and such zero spots are only utilized for controlling purposes on the $C \times D$ portion of the computation. After the impulses have flown through MCRO—2 the RH component representing impulses pass through a group of transfer lines generally designated 594LH and through the PS—7 group of contacts which are now in shifted position and thence over to the 586LH lines and down to the LH accumulator through the circuits previously traced including the column shift contacts. Other impulses representative of RH components of partial products flow out of the MCRO—2 readout over the transfer lines generally designated 594RH, through the PS—8 group of contacts which are in shifted position to the 586RH lines and thence through to the RH accumulator, through the circuits previously traced.

The foregoing description has explained the manner in which $A \times B$ plus $C \times D$ computation is handled and the manner in which the partial products of such a computation are entered into the LH and RH accumulators. It should be explained in connection with the foregoing that provision must be made for re-initiating the operation of the machine for $C \times D$ computation after the $A \times B$ computation is completed. This re-initiating of this $C \times D$ computation is effected in the following manner. The momentary energization of relay coil 571m in the manner previously described momentarily opens the related contacts 571 (Fig. 31g). The opening of these contacts de-energizes relay coils N and R. The momentary energization of relay coil 593m (Fig. 31b) causes closure of contacts 593 (Fig. 31g) energizing relay W. The energization of relay coil W closes relay points W—2 and a stick circuit is established through contacts 595 now closed. The energization of W (Fig. 31g) causes closure of relay points W—1 (Fig. 31b) and current is again supplied from the left side of the D. C. line through the 580 circuit over through contacts PS—4 which have now been shifted to the zero section of the MPRO—2 readout. The multiplying cycle is then initiated through the cycle controller in the manner previously explained. It may be explained that the energization of W (Fig. 31g) also closes points W—3. Upon closure of cam contacts CC—7 relay coil V is energized and the same is maintained energized by the stick contacts V—2. Energization of relay coil V closes relay points V—1 (Fig. 31b) and supplies A. C. from the 563 side of the line to the cycle controller control contacts Yu—2, Yt—2, Yh—2, etc. The multiplying computation now proceeds for $C \times D$ and finally all of the partial product components of this second part of the multiplying computation are entered into the RH and LH accumulators. Upon completion of the multiplication of $C \times D$ the circuit through 581 will again be established (Fig. 31b) then upon the closure of CC—4 current will flow through the switch 582, through the three-blade contacts 583, which it will be recalled will have been previously shifted by the previous energization of 162MC, so as to direct current over to the line generally designated 596. The energization of relay coil 595m (Fig. 31b) opens up relay points 595 (Fig. 31g) and breaks the stick circuit for relay coil W and also coil V. The de-energization of relay coil W causes the opening up of points W—1 (Fig. 31b) and de-energizes all of the Y relays. The de-energization of relay coil V (Fig. 31g) causes the opening up of points V—1 and interrupts the circuit through the Yu—2, Yt—2, Yh—2, etc. group of contacts.

The energization of magnet 162RH (Figs. 31b and 31f) causes the RH 1 to 16 contacts to shift to reverse position to allow reading out from the RHRO readout in the LH accumulator. A relay coil 597m (Fig. 31b) is also energized, but the function of this relay is for computations involving $A \times B$ alone without the $C \times D$ computation and it need not therefore be explained at this point.

Before describing the gathering together of the RH components of the partial products into the LH components of partial products a description will be given of the operation of the machine in the event than an $A \times B$ minus $C \times D$ computation is to be performed by the machine. When such computations are to be performed, the switch 584 (Fig. 31c) is thrown to the minus position. It has been previously explained that upon the completion of the $A \times B$ computation, one of the 162MC magnets was energized, which allows the shift of the three-blade contact 592 (Fig. 31c) to the reverse position from that shown. With the switch 584 preset to the minus position, current from the 563 side of the A. C. line in place of flowing to the emitter 152 will flow through the 592 three-blade contacts which are in shifted position upon the energization of one of the magnets 162MC through the switch 584 to the complemental emitter 153. Emitter 153 is complemental with respect to emitter 152, that is, it is so connected in circuit to the lines 585 that on encountering the 9 spot on emitter 153 an impulse is emitted to the zero line of the 585 group. Such zero line previously was not employed on multiplying relays which handled simple products.

Likewise the number 8 spot of the 153 emitter is connected to the line of the 585 group, designated 1 which leads to the 1 spot of the 152 emitter and so on.

On Fig. 31c, it will be noted that the extra zero line of the 585 group extends to contacts of the multiplying relays for controlling purposes in complemental multiplication. Such contacts connected to the zero line are employed for the LH group of contacts as follows. X—1, X—2 and so forth through X—9, and for the RH group, contacts are provided connected with the aforesaid zero line for X—2, X—4, X—5, X—6 and X—8. Heretofore with simple multiplying machines involving no complemental multiplication no LH X—1 contacts have been provided, but such LH X—1 contacts are required in complemental multiplication, since while with a normal multiplication the LH component of any digit multiplied by 1 is zero, with complemental multiplication the left hand component of any digit multiplied by 1 is always 9, thus:

| Regular | Complementary |
|---|---|
| 1×1 equals 01 | 1×1 equals 98 |
| 1×2 equals 02 | 1×2 equals 97 |
| 1×3 equals 03 | 1×3 equals 96 |
| 1×4 equals 04 | 1×4 equals 95 |
| etc. | etc. |

In further explanation of the contacts connected to the zero line of the 585 group and with reference to the RH contacts, assuming a multiplication of 5×6. Straight multiplication of 5×6 gives 30, nines complemental multiplication of 5×6 gives 69. It will be further noted that the zero line of the 585 group is not connected to any spot of the 152 emitter.

The result of this complemental arrangement of emitters and of the wiring and contacts of the MPR relays is such that with the emitter 153 in action, in place of emitter 152, the amounts which will be emitted through the multiplying plate panel relay contacts, instead of being LH and RH components of partial products will be the nines complements of the partial products, for example with a multiplying computation say 4×3, the impulses which would be directed into the LH and RH accumulators instead of representing 1 and 2 respectively, would represent 8 and 7, 8 and 7 being the nines complements of 1 and 2. Accordingly, it will be seen that with the present machine, subtracting is effected by and upon and as an incident to multiplication.

It may be explained that it is not desired to enter into the LH and RH accumulators the nines complementary partial products of $C \times D$, but it is desired that the machine enter thereinto the true complements of the partial products. The arrangement of the complemental emitter is such that it directs complemental impulses complemented to 9 through the multiplying plate relay contacts and that these impulses flow through the MCRO—2 readout devices and after leaving such readout devices they are entered into the LH and RH accumulators together with an additional unit amount in each accumulator to bring the nines complement of each partial product to the true or tens complement of each partial product. The manner of adding this extra 1 to the nines complemental partial products will be subsequently explained.

The term "true" complement has the following significant meaning. If all orders are complemented to 9, this is a 9's complement, if all orders are complemented to 10, this is a 10's complement, if the lower orders are complemented to 9 and the highest order where a significant figure occurs is complemented to 10, this is a "true" complement.

When nines complemental products are produced, nines must be entered into the accumulating devices in columns which otherwise would receive no entry, that is if the machine would otherwise introduce a zero entry in a particular column when complementary operations are being performed, a nine must be entered in that column. The introduction of nines into such columns of the accumulators is provided for in several ways. First the multiplicand readout device is employed to direct the entry of nines into columns to the left of the highest significant figure of the multiplicand and in columns of the multiplicand in which a zero appears. The entry of nines as controlled by the MCRO—2 readout device in the above manner will now be described.

Referring to the circuit diagram (Fig. 31c) a circuit 598 is shown connected to the number 9 spot of emitter 153.

Referring now to Fig. 31d a branch circuit 599 connects to the circuit 598 and extends to the MCRO—2 readout and is electrically wired to all of the 441 zero spots of such readout. Nines representing impulses will be transmitted over the said circuits 598 and 599 to all of the zero spots 441 and through any brush of the readout standing on zero to the corresponding common segment of the readout. Accordingly, nines representing impulses will be transmitted through any columns of the multiplicand in which zeros appear and also through any columns to the left of the highest significant figure in the readout to the transfer lines 594LH and 594RH and thence down through the circuits previously traced to the LH and RH accumulators.

The foregoing has explained how nines as a result of nines complemental multiplication are entered, which nines in an illustrative example to be hereinafter given, will be designated $9_x$ and how nines from the zero spots of the MCRO—2 readout are entered. Such nines from the zero spots in the illustrative example will be designated $9_0$. It has also been explained that an additional increment of 1 is to be added to each nines complemental partial product to bring such nines complemental partial product to a true complemental partial product. For convenience in construction and in order to obviate the necessity of shifting the entry of the additional 1 as column shift action proceeds, it is preferable to enter such increment of 1 always into the lowest order of the LH and RH accumulators. Accordingly, when nines complemental partial product entries are shifted into relatively higher orders or in the event that no entry is directed at all into the lowest order (as is the case with the LH accumulator for the first entering operation), provision must be made to enter nines to the left and right in unused columns of the accumulators. The entry of these nines in these other positions to the left or right is effected by the column shift contact devices. By reference to Fig. 31e, it will be noted that the line 598 which comes from the 9 spot of the complemental emitter 153 on Fig. 31c extends down to and is wired to a number of sets of contacts on the column shift relays. Taking first the CSu column shift relay contacts shown to the right in Fig. 31e, it will be noted that line 598 connects to eight contacts. These eight contacts upon their opposite side connect to eight of the 598RH lines and accordingly upon closure of the CSu relay contacts to the right nines will be entered into the RH accumulator in the eight columns related with and connected to these lines. It will be remembered that the RH accumulator has sixteen positions and accordingly the column shift relay contacts CSu to the right takes care of the eight positions to the left of the 0 which are cared for by the zero and regular spots of the MCRO—2 readout.

Referring now to the column shift contacts CSt to the right, it will be noted that while there are still eight contacts connected to the line 598, that the uppermost contact connects to the lowest order line of the 598RH group. This provides for the entry of a 9 in the column to the right upon column shift to the tens order position. The remaining seven contacts provide for the entries of seven nines to the left. A similar arrangement is provided for succeeding columnar orders of the CS multi-contact relay devices. It will also be noted that the line 598 extends around and connects also with certain contacts of the CSu column shift relay devices to the left which control the entry of nines into the proper orders of the LH accumulator in a similar manner. Nines entered under column shift control will be designated 9. It will be noted that the arrangement is such that the first nines complemental partial product entry in LH introduces a nine in the units order.

The foregoing description has explained the manner in which nines complements of left hand and right hand components of partial products are entered into the LH and RH accumulators. It now remains to explain how the extra 1 is added so that in place of providing entries of nine complements of the partial products, true or actual complements are entered into the accumulator devices. The entry of the additional 1 into the lowest orders of the LH and RH accumulators is effected in the following manner.

Referring to the circuit diagram (Fig. 31c) it will be noted that the extra spot 605 on the 153 emitter is wired to a circuit 606. 606 extends down to Fig. 31f and is wired to two magnets 607 and 608. These magnets 607 and 608 are arranged respectively in the LH and RH accumulators to trip the carry lever latch pertaining to the lowest order wheel of the LH accumulator and RH accumulators respectively. The carry lever latch which is tripped by these magnets is the carry lever latch customarily used in such accumulators and is the carry over latch or fish hook shown as the part 33 in Hollerith Patent No. 974,272. It will be understood that the energization of magnet 607 trips such carry over latch for the LH accumulator and the energization of 608 trips such carry over latch for the RH accumulator. The effect of tripping such carry latch is, upon the operation of the accumulator, to add an extra 1 into the units order of the LH and RH accumulator just as if there had been a previous carry from a still lower order in such accumulator. In this way while there is a nines complement of the partial product entered into both the LH and RH accumulator there is also an additional unit of one added into each of the accumulators in the lowest order so that the final entry into the accumulators becomes the true complement instead of the nines complement of the product $C \times D$.

After the true complements of the partial products have been entered into the LH and RH accumulators, the next step in the operation is to transfer over and gather together the separate partial product accumulations including the accumulations of complements of partial products into one and the same accumulator. This is effected in the customary manner, viz. energization of magnet 162RH (Fig. 31b) shifts the RH 1 to 16 three-blade contacts to the reverse position from that shown in Fig. 31f so that subsequently upon emitter 154 coming into action the amounts standing on the RH accumulator and represented on the RHRO readout device can be carried over and entered into the LH accumulator. The emitter circuit to the 154 emitter is set up as follows. Contacts LHE are closed at this time in the cycle of operation of the machine to supply current to the emitter 154 and to emit the impulses out through the RHRO readout device over to the LH accumulator. It may be explained that concurrently with the shifting of contacts RH 1 to 16, contacts RHB are closed. Accordingly when the emitter 154 encounters the extra spot, a circuit is established from the 563 side of the line through the LHE contacts, through the emitter 154, through RHB, through the reset magnets 609, 610, 611 and 612 which are the reset magnets in the MP receiving devices and the MC receiving devices (see Fig. 1). With the reset of the MC—1 receiving device the three-blade contacts PS—1 to PS—8 inclusive, and 593 and 592 are reset to the position shown on the circuit diagram. The receiving devices are now in condition to receive a further entry of new items A, B, C and D. At the same time that contacts RH 1 to 16 were closed, contacts RHA (Fig. 31f) were closed. Accordingly, upon the emitter brush encountering the last spot, a magnet 162LH is energized (see Fig. 14). Energization of 162LH shifts the LHA, LHE, LHB, LHF and LHC contacts to reverse relation from that shown in Fig. 14. Opening of contacts LHE prevents a repeated and unwanted second carry over of the RH accumulation to the LH accumulator.

The result of the computation is now in the LH accumulator and the machine is ready to punch out such result on the record card.

Referring now to Figs. 31f and 31g, energization of 162LH has brought about the closure of contacts LHC (Fig. 31g). Upon closure of LHC and at the proper time in the cycle and upon closure of cam contacts CC—3, a circuit is established through LHC, through CC—3, through relay coil B. The energization of coil B closes stick contacts B—1 setting up a stick circuit for relay B. A circuit is thereupon also established from the 562 side of the line through contacts 299 now closed, via wire 613 to the common conducting strip 313 of the punch (see Fig. 31f). The brush 314 then traverses over the spots 312 which by the plug board connections at 614 are wired up to the LHRO readout. The LHRO readout is also wired up to the punch selector magnets 615. Punching operation then proceeds in the customary manner column by column and step by step until the result is completely punched upon the card. Upon completion of punching the completely punched card is ejected from the punch. The initiation of a new card handling cycle in the main card feed and reading section of the machine is brought about in the following manner.

Referring to Fig. 31g contacts RHD close with the energization of magnet 162 (Fig. 13). Contacts LHB close later in the cycle upon completion of the transfer over of amounts from RH to LH. Upon closure of both RHD and LHB card feed clutch magnet 566 is energized provided contacts P—1 are closed. In this way a new card handling operation is initiated.

*Reset of LH and RH accumulators*

It has been previously explained how a reset of the MC receiving devices was initiated. Upon reset of MC—1 contacts 158 (Fig. 1) close and closure of such contacts (see Fig. 31c) establishes a circuit from the A. C. line 563 through the RH reset magnet 616. Energization of 616 (see Fig. 1a) brings about the reset of the RH accumulator. Reset of the LH accumulator is brought about by energizing its reset control magnets 617 by closure of contacts LHD (Fig. 31c), P—6 and CC—5.

It was previously explained that if desired, the machine could be pre-set to merely handle simple $A \times B$ computations and to omit all of the $C \times D$ computations. Setting the machine for such operations is effected by displacing switch 582 to the dotted line position (Fig. 31b). For such simple $A \times B$ computations, switch 618 (Fig. 31a) must also be opened so as to cut off the MC—2 and MP—2 receiving devices from their connection to ground.

The manner in which the machines carry out the various kinds of computations can be summarized from consideration of the typical computations given on Figs. 32 to 34 inclusive of the drawings. As stated the machine is adapted to handle a problem of the typical form numbered 1, viz. $A \times B$ plus $C \times D$ and also a problem of typical form numbered 2, viz. $A \times B$ minus $C \times D$. It will be assumed that the amount of the item A is 2,000,000, item B is 4, item C is 3,504 and item D is 506. The answer to computation of problem 1 is 9,773,024. In handling this problem the machine proceeds in the regular way, that is it enters the LH and RH components of the partial products of $A \times B$ into the LH and RH accumulators concurrently. With the figures assumed there is no LH partial product component of $A \times B$, but there is a mere RH component. This is the entry shown in line 1 of the computation, Fig. 32. The next concurrent entry into the LH and RH accumulators is the entry of the LH and RH components of the multiplication of $3,504 \times 6$. This is the line 2 entry. Following this there is another LH and RH entry of partial products of $3,504 \times 5$. This is the line 3 entry. The next showing of this typical computation (Fig. 32) shows the transfer of the RH accumulation into the LH accumulation and there is finally given the answer of 9,773,024, which is the result of the computation $A \times B$ plus $C \times D$.

In handling the number 2 type of problem involving subtraction, the machine proceeds as follows. The first entry into LH and RH accumulators is the entry of the LH and RH components of the partial product of $A \times B$ just as in line 1 of the previous computation (Fig. 32). The following entry involves several correlated entering operations. The machine enters into the LH and RH accumulators the nines complements of the partial products of the multiplication of $3,504 \times 6$ or expressed differently it enters the nines complement of line 2 of the computation shown in Fig. 32. In making this entry the machine enters certain nines under the control of the zero spots of the readout device and such nines on the drawing are given a designating suffix thus $9_0$. It also enters certain nines which are derived as the result of complemental multiplication. Such nines are designated with the suffix $x$, thus $9_x$. There is also an entry of extra nines under control of the column shift. Such nines are shown as simple nines with no suffix and it will be noted in Fig. 33 that in the LH accumulator seven of these nines (9) are introduced to the left and one of them to the right and that in the RH accumulator eight of these column shift nines are entered to the left.

The next amount entered is the extra increment of one which is entered in the lowest columnar order of the LH accumulator and the RH accumulator.

While the aforesaid entries of nines complements, extra nines and the extra increment of one are shown on three succeeding lines, it will be understood that in the actual operation of the machine such entries are effected concurrently and in one counter cycle. This will be clear from Fig. 34, which shows such concurrent entry. The machine then proceeds with the further computation by entering the nines complement of line 3 from Fig. 32, entering extra nines and increments of one. The ultimate answer on the LH accumulator is shown by the summation appearing below the addition line.

The final operation is the same as with Fig. 32, that is there is a transfer of RH to LH and the ultimate answer is 6,226,976.

Fig. 34 requires no detailed description. It is merely given to show that the entries of column shift nines and extra increments of one are made concurrently and in the same counter cycle. The computation problem is identical with the computation in Fig. 33, except that the entries are shown in their true relation to the counter cycles of the machine.

In short the present machine in effecting multiplying operations involving subtraction, proceeds by immediately creating a nines complemental of the partial products by and as a result of the multiplying operation itself. The machine fills in extra nines in columns of the LH and RH accumulators. Certain of these extra nines are derived from the multiplicand readout device from the intermediate columns in which zeros appear or in columns to the left of the highest significant figure of the multiplicand. Other nines into other columns of the accumulators are entered from the column shift device and an increment of one is added to both the LH and RH accumulators to bring the entered nines complement of the partial products to the true complement of the partial products.

It may be further explained that the machine is intended for operation only with positive balances, that is the multiplication of $A \times B$ must be greater than the multiplication of $C \times D$ when products are to be subtracted in order to have a final set up on the LH accumulator which is capable of being read out as a direct and true number instead of a complementary quantity. In other words, the machine as shown is not intended for reading out negative results.

Referring to the timing diagram (Figs. 30 and 30a), the timing diagram shows the operation of the machine related to counter cycles and card feed cycles. The vertical subdivisions indicated at the top of the diagram between points D and D designate a counter cycle. Two counter cycles are correlated to one card feed cycle. The first four counter cycles shown on Fig. 30 show the operations in starting up the machine and in reading in the first card. The extreme right hand counter cycle shown on Fig. 30 is the cycle in which the card reaches the punching section of the machine at the R position and after which it is transferred to the R—1 position. The cycles indeterminate in number designated A×B and C×D on Fig. 30a are the multiplying cycles proper. These cycles are indeterminate in the number depending upon the size of the computation and particularly depending upon the number of significant places in the multipliers. Following the C×D multiplying cycle there is a counter cycle shown in which the transfer of the RH components of partial products to the LH accumulator occurs. Following this counter cycle, the punching steps are delineated and in these punching cycles there is a new card feed of a card into the machine.

By way of explanation on a continued run of cards through the machine the last two counter cycles shown on Fig. 30a, will be immediately followed by the fifth counter cycle shown on Fig. 30. The legends on the timing diagram show the time when different operations in the machine occur and these will require no detailed explanation.

Heretofore in the specification and hereinafter in the claims various forms of relay devices have been and will be referred to. Some of these relays are of purely electrical type such as the Y relays. Other relays are of the electromagnetically tripped but mechanically controlled and restored multi-contact type. Such relays are used for multiplier selection and column shift purposes and are of the type shown in Figs. 6 to 12 of the drawings. Other relays are of the type shown in Figs. 13 to 14 which relays are electromagnetically tripped but mechanically restored and relatched.

What I claim is:

1. A machine with multiple entry receiving devices for four factors, multiplying means for multiplying said factors by pairs and result receiving means, means to control the multiplying means to produce true and complemental products, multiplication control means cooperating with the entry receiving devices and intermediate the entry receiving devices and the result receiving means for controlling the last mentioned means and for also directing into the result receiving means true computed products pertaining to two factors and complementary computed products pertaining to two other factors, said multiplication control means including means to effect such directed entries into the result receiving means in succession.

2. A machine with entry controlled amount manifesting means for two pairs of factors, one pair of which when multiplied represents a positive quantity with a plus sign and the other pair of which when multiplied represents a negative quantity with a minus sign, means for successively multiplying both pairs of factors, means for accumulating the products together in succession and a control for said multiplying means for taking into account the sign of each pair of factors so as to obtain positive and negative quantities which, when accumulated, represent the algebraic sum of the products all by a continuous uninterrupted operation of the machine.

3. A record controlled accounting machine with a plurality of automatically operated record controlled receiving means for four different factors whereby such factors as derived from a record may be automatically entered therein, multiplying devices controlled from the entry receiving means for the factors, control means successively brought into operation during multiplying operations, result receiving means, and means controlled by said control means for controlling the operation of the multiplying devices so that the latter continuously and in automatic succession obtain first computed results pertaining to one product of two factors and cause the setting up of said computed results upon the result receiving means of the machine and thereafter obtain and enter into the result receiving means computed results in complemental form pertaining to the product of two other factors and means for thereafter automatically causing computed results to be gathered together and the final result set up upon a portion of the result receiving means of the machine.

4. A record controlled accounting machine with a plurality of automatically operated record controlled entry receiving means for four different factors whereby such factors as derived from a common record may be automatically entered therein, computing means, initiating controls brought into action by the computing means, means controlled through intervening means from the entry receiving means for automatically obtaining the difference between the two products, said means comprising multiplying means controlled from the entry receiving means and a result receiving means, and control means for the computing means brought into action by the initiating controls so that upon a continuous power operation of the machine there is caused to be entered in succession a true product of one multiplication of two factors and the complemental product of a second multiplication of two other factors, whereby a final result is set up upon the result receiving means which is representative of the difference of two products.

5. In an accounting machine for obtaining the net result of a computation which involves obtaining the difference between two products, factor manifesting means for the factors of the computation, means controlled by the factor manifesting means for multiplying two factors of a first multiplication, product receiving means receiving the product, means for utilizing the foregoing multiplying means for effecting a second multiplication of two different factors including means controlling the multiplying means for directly obtaining the results in complemental form for entry in complemental form into the said products receiving means at a different time from the time of entry thereinto of the first mentioned product, whereby one product is subtracted from another product.

6. An accounting machine for obtaining the net result of a computation involving two multiplications and a subtraction of the two products, said machine including products representing means, and means for controlling it including multiplying means comprising means for obtaining a true product of one multiplication and comprising means for directly obtaining by the multiplying means during another multiplication a complementary product of another computation, and control means for causing the successive entry at different times of the respective results into the products representing means.

7. In an accounting machine with dual accumulating means with means for transferring totals from one accumulator to the other, and comprising in combination means for forming and for entering concurrently into the two accumulators the true right and left hand components of a product of two factors, and means controlling the aforesaid forming means for forming the complementary values of the right and left hand components of another product of two factors for entry into the two accumulators at a different time, said total transfer means gathering together in one accumulator, the accumulated components into a final setting representative of the algebraic sum of the two products.

8. A record controlled accounting machine with record controlled entry receiving means for the factors A, B, C and D multiplying and product setup means for multiplying $A \times B$ and setting up the product thereof, means for thereafter automatically controlling the said same multiplying and product setup devices for multiplying $C \times D$ and accumulating the product with the other product.

9. A record controlled accounting machine with record controlled receiving means for the factors A, B, C and D, multiplying and amount receiving means for multiplying $A \times B$ and for setting up the product component result thereof, means for utilizing the multiplying and amount receiving means for $C \times D$ computations, means for directly obtaining the nines complement of the product, means providing for the entry of an extra one into the amount receiving means, and control means called into action by the multiplying means and effective upon the multiplying of $C \times D$ for directing the entry of the aforesaid nines complement of the product and for causing the aforesaid extra one means to bring about an entry of the extra one so that a final entry in the amount receiving means is obtained of the true complement of $C \times D$, which complementary product is accumulated together therein with the product of $A \times B$.

10. An accounting machine with item entry receiving means for entering items C and D thereinto, multiplying devices controlled by the foregoing entry receiving means for multiplying $C \times D$ and for directly obtaining as an incident to the multiplying operation the nines complement of the product of $C \times D$, and means modifying the nines complement of the product thus obtained to convert the same into the true complement of the product.

11. An accounting machine with means for setting up therein items A, B, C and D, multiplying and product representing devices controlled by the setup means upon which A and B are set up for multiplying $A \times B$ and representing the product thereof, means controlling the multiplying and product representing means by the setup means for items C and D for multiplying $C \times D$ and additional control means for said multiplying devices for directly obtaining as an incident to the multiplication the nines complement of $C \times D$ and for entering into the product representing devices the nines complement of the product of $C \times D$ increased by one at a different time than the time of entry of $A \times B$ whereby the product representing device receives a final setting to represent $A \times B$ minus $C \times D$.

12. An accounting machine including entry controlled amount manifesting devices for a plurality of factors of a computation, multiplying means controlled from the manifesting means for one pair of factors for setting up first partial product results upon result setup means, means thereafter controlled by the amount manifesting means for a second pair of factors for controlling the aforesaid setting up means to effect the multiplying of the second pair of factors, said last mentioned means including a supplemental control means for controlling the multiplying means during multiplying of the second pair of factors to concurrently effect a subtraction of the product of such factors from the first component result set up on the result setup means.

13. An accounting machine including entry controlled amount manifesting means for four factors, multiplying means controlled from the amount manifesting means for one pair of factors for setting up upon result setup means first partial product component results, means operative at a different time and controlled from the manifesting means for a second pair of factors for causing the aforesaid multiplying means to effect multiplying of the second pair of factors, said last mentioned means including a supplemental control for controlling the multiplying means during multiplying to, by a concurrent operation, obtain a product of the second pair of factors in complemental form whereby concurrent multiplication of such two factors and subtraction of their product from the first component result may be secured.

14. An accounting machine including devices for setting up in the machine the factors of two separate computations, result receiving means, multiplying means for effecting the creation of results for entry into the foregoing result receiving means, said multiplying means being first controlled by the devices upon which the factors of the first computation are set up and subsequently controlled by the devices upon which the factors of the second computation are set up, control means successively brought into operation during multiplying computations, means cooperating with said multiplying means and controlled by said control means to cause the first multiplying computations of one pair of factors to be effected to produce true number results and to cause the second computation to be effected to produce complementary results whereby the results of the second computation are concurrently multiplied and subtracted from the first computed results upon entry into the result receiving means.

15. A machine for concurrently multiplying and subtracting, including partial product creating and setting up devices, and means for controlling said devices for either creating true number partial products or complementary number partial products so that upon the successive entry of both kinds of partial products into the products setup devices, one product can be subtracted from the other product during the multiplying operation when one product is being created.

16. A machine for multiplying and for also subtracting while multiplying, comprising in combination, partial product registering means of a uni-directional motion type, means including multiplying devices for directing entries into said registering means of true number result components and means including said multiplying devices for directing thereinto and at a different entry time complementary product results whereby upon completion of the whole computation the registering means contains a result which represents the product results of the second part of the computation subtracted from the first component results.

17. A multiplying machine with accumulating devices controlled by differentially timed impulses, switching devices for controlling the entry of impulses thereinto in accordance with the multiplication of a pair of factors, and means for emitting through said switching devices to the accumulating devices complementary differentially timed impulses when multiplication and subtraction are to be concurrently performed.

18. A multiplying machine with accumulating devices controlled by differentially timed impulses, switching devices for controlling the flow of impulses to the accumulating means in accordance with the multiplication of a pair of factors, and means for optionally directing through said switching devices to the accumulating devices either straight differentially timed impulses or complementary differentially timed impulses according to whether simple multiplication is to be performed or multiplication with concurrent subtraction of the product.

19. A multiplying machine with left hand component lines leading to left hand component accumulating means and right hand component lines leading to right hand component accumulating means, a set of simple impulse lines, switching means intermediate said last mentioned set of lines and the two first mentioned set of lines and emitting means for directing impulses upon the simple impulse lines, said emitting means including means arranged to emit upon the simple impulse lines straight differentially timed impulses and including means arranged to emit upon the simple impulse lines complementary differentially timed impulses.

20. A multiplying machine with electromagnetically controlled accumulator devices, factor entry controlled amount manifesting means, multiplying means controlled by the amount manifesting means, means for controlling the multiplying means to provide nines complementary impulses of a partial product of two factors and for directing into the aforesaid devices impulses which are representative of a nines complement of a partial product of two factors entered upon the factor entry controlled amount manifesting means, supplemental means for causing the entry of nines in all unused denominational places of the said accumulator and means for causing the entry of an extra unit in one of the columns of the accumulator whereby multiplication with attendant subtraction may be secured.

21. A multiplying machine with multiplying devices and means for controlling the same in accordance with entered factors, and means for controlling the creation of either true or complemental partial products by the multiplying devices.

22. A multiplying machine with partial product receiving and setting up means, factor entry controlled amount manifesting means, partial product creating means controlled from the aforesaid amount manifesting means, means including control means controlled by intervening means cooperating with the amount manifesting means for directing partial products into said partial product receiving and setup means, and means controlled by said last mentionel control means for controlling the character of partial product which is entered so as to effect additive entries and subtractive entries.

23. A multiplying machine with partial products accumulating means, factor entry controlled amount manifesting devices, and means including multiplying means under control of the amount manifesting devices and of a supplemental control means, for directly creating complemental representations of partial products and for entering the same into the accumulating means.

24. A multiplying machine with partial product accumulating means, factor entry controlled amount manifesting means with means controlled thereby for selecting and directing the entry of partial products into the accumulating means, and means cooperative with the same factor entry controlled amount manifesting means for optionally effecting an entry into the accumulating means of either true partial products or complemental partial products.

JAMES W. BRYCE.